US005719771A

United States Patent [19]

Buck et al.

[11] Patent Number: 5,719,771

[45] Date of Patent: Feb. 17, 1998

[54] SYSTEM FOR MAPPING OCCURRENCES OF CONDITIONS IN A TRANSPORT ROUTE

[75] Inventors: James C. Buck, Reston, Va.; Thomas J. Schoenleben; David E. Haupt, both of Jacksonville, Fla.

[73] Assignee: AMSC Subsidiary Corporation, Reston, Va.

[21] Appl. No.: 566,410

[22] Filed: Dec. 1, 1995

Related U.S. Application Data

[63] Continuation-in-part of Ser. No. 22,037, Feb. 24, 1993, Pat. No. 5,475,597.

[51] Int. Cl.[6] .................... G06F 165/00

[52] U.S. Cl. .................... 364/443; 364/424.034; 364/424.04; 364/449.7; 340/438; 340/988

[58] Field of Search .................... 364/443, 424.034, 364/424.035, 424.038, 424.039, 424.09, 449.1, 449.7, 566; 340/438, 439, 988

[56] References Cited

U.S. PATENT DOCUMENTS

| | | | |
|---|---|---|---|
| 4,188,618 | 2/1980 | Weisbart | 364/424.04 |
| 4,258,421 | 3/1981 | Juhasz et al. | 364/424.04 |
| 4,561,057 | 12/1985 | Haley, Jr. et al. | 364/436 |
| 4,688,026 | 8/1987 | Scribner et al. | 340/572 |
| 4,688,244 | 8/1987 | Hannon et al. | 379/58 |
| 4,745,564 | 5/1988 | Tennes et al. | 364/566 |
| 4,750,197 | 6/1988 | Denekamp et al. | 379/58 |
| 4,793,477 | 12/1988 | Manning et al. | 206/232 |
| 4,831,539 | 5/1989 | Hagenbuch | 364/424.04 |
| 4,884,208 | 11/1989 | Marinelli et al. | 364/460 |
| 5,014,206 | 5/1991 | Scribner et al. | 364/443 |
| 5,129,605 | 7/1992 | Burns et al. | 246/5 |
| 5,303,163 | 4/1994 | Ebaugh et al. | 364/424.034 |
| 5,359,528 | 10/1994 | Haendel et al. | 364/424.04 |
| 5,475,597 | 12/1995 | Buck | 364/443 |

*Primary Examiner*—Gary Chin
*Attorney, Agent, or Firm*—Lowe, Price, LeBlanc & Becker

[57] ABSTRACT

A system for mapping occurrences of conditions along a transport route is provided. The transport route is travelled by a vehicle storing cargo. The system includes at least one mobile sensing station mounted on the vehicle traversing the transport route. The mobile sensing station detects occurrences of the conditions along the transport route to the vehicle. At least one of the conditions indicates that the vehicle is influenced by the conditions. The sensing station receives positional data, correlates the positional data with corresponding occurrences of the conditions, and transmits the correlated data. The system also includes a central controller that receives the correlated data from the mobile sensing station, determines responsive to the correlated data a position on the transport route at which the occurrences of the conditions are detected, and determines responsive to at least one of the position and the transport route, a party responsible/appropriate to be notified of the condition and notifying same of the condition.

46 Claims, 22 Drawing Sheets

SYSTEM FOR MAPPING OCCURRENCES OF CONDITIONS IN A TRANSPORT ROUTE

RELATED APPLICATION

This is a continuation-in-part of U.S. patent application Ser. No. 08/022,037 filed Feb. 24, 1993, now U.S. Pat. No. 5,475,597.

TECHNICAL FIELD

The present invention relates generally to monitoring conditions with respect to cargo on transport routes, and more particularly to a system for mapping the predetermined occurrence of unknown conditions as detected by vehicles in real-time along such a transport route.

BACKGROUND ART

Damage to freight due to rough handling and road conditions is a costly situation. Rough handling can be caused by slack action within a train transporting freight, usually due to poor train handling or by coupling cars at excessive speeds. Rough handling and irregularities along the transport route create additional expenses by forcing shippers and customers to make considerable expenditures on blocking, bracing, and otherwise attempting to cushion the freight being transported. It is necessary to track instances of rough cargo handling and irregular transport routes to take appropriate measures to protect the cargo.

One system for monitoring conditions under which rough handling may be a problem is the use of hand-held radar for measuring coupling performance with respect to freight cars. This measuring system has several flaws. First, the radar operators are in plain view of the switch crews. Consequently, their normal performance may be altered. Second, there are not enough personnel to constantly monitor coupling speeds for the many freight cars required to be handled in order to ensure good coupling practices twenty-four hours a day, seven days a week. Further, the use of hand-held radar is typically dangerous and requires one person to make the readings and another to record them. This system is also inadequate for use along an entire transport route in which irregularities along either a rail route or paved road may contribute to cargo damage.

One prior technique has proposed to monitor the position of the vehicle itself for collecting and storing information during predetermined events. This prior technique, however, does not address the problem of damage occurring to cargo during a transport route. Such a system is described in U.S. Pat. No. 5,014,206 to Scribner et al. In this system only the location of the vehicle is generally determined and recorded during the occurrence of events detected by sensors which respond to such an occurrence. The system is associated with navigational units to receive positional information from a navigation system. The location of the vehicle is stored in a data collector on the vehicle. The date and time of the events may also be stored along with the positional information. The position is determined by means of a navigation system such as GPS or LORAN. The stored information is later transported to an information delivery point and downloaded to a data processing system. Here the information is analyzed to determine the exact location and time of the occurrence of the events, such as the closure of a passenger door of a taxi or bus, or the pickup of waste by a truck.

As illustrated in FIGS. 1 and 3 of Scribner et al., a truck 10 is equipped with a lift arm sensor 18 and rear door sensor 24 which are coupled electrically to a navigational system such as a GPS type system. The truck also has a passive radio transmitter in the form of tag 30 mounted on it. One such tag is described in U.S. Pat. No. 4,688,026 issued to the same inventors. The purpose of this transmitter is to transmit the truck identification number to a base data receiver/computer unit 32 which may be located at the depot where the truck is returned and housed. When the truck leaves the depot, an RF signal from the receiver/computer unit 32 causes the tag 30 to transmit the truck identification to the receiver/computer 32. The receiver/computer records the time, date and truck identification number. On returning to the depot the tag 30 again transmits the truck identification number to the data receiver/computer unit 32. The information contained in the data collector 28 may then be downloaded into the base receiver unit 32. This information may consist of (1) the identification number of the truck, (2) the day, time, latitude and longitude of each occurrence of the lift arm actuating its sensor, and (3) the day, time, latitude and longitude of each occurrence of actuation of the rear door sensor. However, Scribner et al. does not recognize, address or relate to the problem of damage caused to cargo during a transport route. Similarly, Scribner et al. is concerned with the detection of a predetermined occurrence that is known in advance, e.g., the opening of a truck door. However, Scribner et al. does not relate to or address the detection of unknown disturbances, such as detection of cargo conditions caused by events that are not directly measured, such as a bump in the road or track, aggressive driving or control of the vehicle or transport mechanism, and the like. Similar efforts have not been related to the problem of damage caused to cargo during a transport route due to unknown events, and the like. See also U.S. Pat. Nos. 4,688,244 and 4,750,197 relating to detection of unauthorized access to truck container.

In order to properly protect cargo, the acceleration to which the cargo is subjected must be carefully controlled. U.S. Pat. No. 4,745,564 to Tennes et al. describes an impact detection apparatus for measuring and recording acceleration or other physical quantities experienced by easily damaged items of commerce such as fruit, or electronic computers. A triaxial accelerometer or other suitable sensor produces signals which are stored in a memory along with the times of the events which trigger the accelerometer. This provides an event-time history which later may be read from the memory for analysis after the handling or transportation is completed.

Control of the acceleration to which cargo carrying vehicles are subjected can be exerted as described in U.S. Pat. No. 5,129,605 to Burns et al. This document describes a vehicle positioning system using a plurality of inputs such as a GPS receiver, wheel tachometer, O.S. circuits, transponders and manual inputs from locomotive engineers.

Systems exist for continuously establishing and indicating the location of vehicles such as cars, trucks and boats. Such a system is described in U.S. Pat. No. 4,884,208 to Marinelli et al., which is directed primarily towards theft prevention. In this system a master tracking station receives and stores signals representative of the object identification and the location of the object, and may provide a visual indication of the object identification code and object location. Only vehicle location is detected.

The occurrence of events along a transport route is mapped out in U.S. Pat. No. 4,793,477 to Austill et al. However, this system does not include the use of a transmitter, from which information is downloaded into a central controller via a communication system. Nor is location information fed into a sensing module on the vehicle. Rather, the event location is determined by sensing and recording the degree and direction of track curvature for the rails on which the vehicle is travelling.

Similar attempts have been made to perform remote engine monitoring of a vehicle. Such attempts have largely been comprised of the monitoring of vehicle performance characteristics. For example, U.S. Pat. No. 4,188,618 to Weisbart collects vehicle performance information, displays the information in the vehicle, and stores the information in a memory in the vehicle. A processor in the vehicle processes the vehicle performance data, stores and displays the processed information in the vehicle. However, Weisbart does not relate to or address the detection of unknown disturbances, such as detection of cargo conditions caused by events that are not directly measured as described above. Also, Weisbart is unrelated to transmitting such engine monitoring features to a central location that retransmits the information back to the vehicle after processing. In addition, these engine monitoring procedures have not been implemented with a reliable mobile communicator used in vehicles for receiving and transmitting information from, for example, a central control point, other vehicles or land based stations via a satellite system. These mobile communicators are subjected to unusually adverse conditions which result from these environmental or external forces or sources.

None of the aforementioned conventional systems provides the necessary attributes to map, in real-time, a cargo transport route with respect to conditions occurring on that route which may affect the cargo and vehicle operational status. In order to properly protect the cargo travelling along a route, it is necessary to have a timely knowledge of all conditions which might affect the cargo along that route. Such conditions can be natural or man-made, transient or steady state, and can be caused by interaction with other vehicles or individuals, or by the physical condition of the transport route itself. For such a system to be widely used, it must be effective for a variety of types of transport routes, and be able to supply information regarding all the parts of a given transport route over long distances. Such information should be immediately available upon request or the occurrence of an event of interest (affecting transported cargo) along the transport route. Further, overall conditions along the transport route with respect to such occurrences should be recorded for display and easily updated. The information should be immediately available over long distances without having to approach each vehicle carrying the means for sensing the occurrence of conditions of interest.

None of the aforementioned conventional systems provides the necessary attributes to map, in real-time, a cargo transport route with respect to conditions occurring on that route that relate to cargo and vehicle operational status (e.g., engine status) which may be related to, or a function of each other. Further, none of the aforementioned conventional systems provides the necessary attributes to map or track, in real-time, conditions occurring on a transport route that relate to cargo against, or with respect to, vehicle operational status (e.g., engine status) to determine the relationship, if any, between the conditions. For example, we have discovered that it is additionally beneficial to compare the various conditions occurring against each other to determine priority or order of occurrence to further analyze whether one condition affects, relates or is responsible for the occurrence of another condition.

We have further discovered that not only knowledge of where the condition has occurred is beneficial, but also a responsible or appropriate party identified, for example, as the owner of the geographic location, owner of the facilities in a specific geographic location (e.g., owner of railroad track, private road, parking lot, etc.), owner of the vehicle, vehicle operator, and the like.

We have also discovered that there are several instances of data ambiguity, inaccuracy, incompleteness and/or uncertainty relating to the determination of an appropriate party to be notified. Thus, we have discovered that additional information, besides information collected by the sensing station, may also be needed to assist in the identification of the responsible and/or appropriate party. Further, we have also discovered that, at times, the data received from the vehicle and additional information from secondary sources may be in conflict. Accordingly, we have determined that a set of decision rules that intelligently combines information received from the vehicle with information available from other sources provides better results than those obtainable using a single source of information, especially within the required "real-time" like time frame.

Accordingly, it is desirable to provide the necessary attributes to map, in real-time, a cargo transport route with respect to conditions occurring on that route which may affect the cargo and vehicle operational status. It is also desirable to have a timely knowledge of all conditions which might affect the cargo along that route. Such conditions can be natural or man-made, transient or steady state, and can be caused by interaction with other vehicles or individuals, or by the physical condition of the transport route itself. It is further desirable to provide a system that is effective for a variety of types of transport routes, and be able to supply information regarding all the parts of a given transport route over long distances. Further, it is desirable that the overall conditions along the transport route with respect to such occurrences be recorded for display and easily updated. The information should be immediately available over long distances without having to approach each vehicle carrying the means for sensing the occurrence of conditions of interest.

It is further desirable to map, in real-time, a cargo transport route with respect to conditions occurring on that route that relate to cargo and vehicle operational status (e.g., engine status) which may be related to, or a function of each other. It is also desirable to map or track, in real-time, conditions occurring on a transport route that relate to cargo against, or with respect to, vehicle operational status (e.g., engine status) to determine the relationship, if any, between the conditions.

It is also desirable to identify, not only knowledge of where the condition has occurred, but also to identify a responsible or appropriate party, for example, as the owner of the geographic location, owner of the facilities in a specific geographic location (e.g., owner of railroad track, private road, parking lot, etc.), vehicle operator, and the like.

It is also desirable to determine the appropriate party to be notified in the presence of data ambiguity, inaccuracy, incompleteness and/or uncertainty. It is also desirable to utilize additional information, besides information collected by the vehicle, to assist in the identification of the responsible and/or appropriate party.

It is also desirable to determine the appropriate party to be notified even though the data received from the vehicle and additional information from secondary sources may be in conflict. Further, it is desirable to utilize a set of decision rules that intelligently combines information received from the vehicle with information available from other sources provides better results than those obtainable using a single source of information to identify the appropriate party.

It is further desirable to provide a mobile communicator that are robust and resistant to unusually adverse conditions which result from environmental or external forces/sources.

DISCLOSURE OF THE INVENTION

One feature and advantage of the present invention is to provide timely mapping of entire cargo transport routes with respect to conditions impacting cargo being transported along those routes.

Another feature and advantage of the present invention is to periodically trigger information regarding transport route conditions in a timely fashion so that it is possible to have real-time knowledge of conditions which impact upon cargo being transported along a particular transport route.

Yet another feature and advantage of the present invention is to determine transport route conditions and the events along that route impacting upon cargo in a specific vehicle without having to approach that vehicle.

A further feature and advantage of the present invention is to maintain a current record of a particular cargo transport route for immediate display upon request by a user remote from the storage location at which the transport route data is correlated and stored.

Still a further feature and advantage of the present invention is to provide a system in which the location of a particular vehicle and the condition of its cargo can be accessed by a remote user upon demand.

Another feature and advantage of the present invention is to provide the necessary attributes to map, in real-time, a cargo transport route with respect to conditions occurring on that route which may affect the cargo and vehicle operational status.

Another feature and advantage of the present invention is to have timely knowledge of all conditions which might affect the cargo along that route. Such conditions can be natural or man-made, transient or steady state, and can be caused by interaction with other vehicles or individuals, or by the physical condition of the transport route itself.

It is another feature and advantage of the present invention to provide a system that is effective for a variety of types of transport routes, and be able to supply information regarding all the parts of a given transport route over long distances. Further, it is another feature and advantage of the present invention that the overall conditions along the transport route with respect to such occurrences be recorded for display and easily updated. The information should be immediately available over long distances without having to approach each vehicle carrying the means for sensing the occurrence of conditions of interest.

The present invention is based, in part, on the discovery of the problem of determining the cause of one or more conditions occurring along a transport route. The present invention is also based on the realization that multiple conditions may occur, and that one condition may indicate or provide additional information for another condition.

It is another feature and advantage of the present invention to map, in real-time, a cargo transport route with respect to conditions occurring on that route that relate to cargo and vehicle operational status (e.g., engine status) which may be related to, or a function of each other. It is another feature and advantage of the present invention to map or track, in real-time, conditions occurring on a transport route that relate to cargo against, or with respect to, vehicle operational status (e.g., engine status) to determine the relationship, if any, between the conditions.

The present invention is also based, in part, on the discovery that there may be various parties that are "responsible" for maintaining the transport route, and therefore, responsible for conditions occurring thereon. Further, the present invention is also based, in part, on the discovery that such information indicating conditions occurring along separate transport routes requires routing to a central station that is neutral to all parties relating thereto.

Accordingly, it is another feature and advantage of the present invention to identify, not only knowledge of where the condition has occurred, but also to identify a responsible party, for example, as the owner of the geographic location, owner of the facilities in a specific geographic location (e.g., owner of railroad track, private road, parking lot, etc.), vehicle operator, and the like. Further, it is another feature and advantage of the present invention route the information relating to conditions to a central controller that is neutral to all parties involved.

It is another feature and advantage of the present invention to determine the appropriate party to be notified in the presence of data ambiguity, inaccuracy, incompleteness and/or uncertainty. It is another feature and advantage of the present invention to utilize additional information, besides information collected by the vehicle, to assist in the identification of the responsible and/or appropriate party.

It is another feature and advantage of the present invention to determine the appropriate party to be notified even though the data received from the vehicle and additional information from secondary sources may be in conflict. Further, it is another feature and advantage of the present invention to utilize a set of decision rules that intelligently combines information received from the vehicle with information available from other sources provides better results than those obtainable using a single source of information to identify the appropriate party.

It is another feature and advantage of the present invention to provide a mobile communicator that are robust and resistant to unusually adverse conditions which result from environmental or external forces/sources.

These features and advantages are accomplished using a method of mapping the occurrence of conditions along a transport route travelled by a mobile sensing station connected to a central controller via a first communication system. The mobile sensing station continuously senses for the occurrence of the conditions along the transport route. When these conditions are detected, data regarding these conditions are stored, as well as time and date data corresponding to the subject occurrences. Positional data is also received and correlated with the occurrence. The mobile sensing station is then triggered to transmit the correlated data over the communication system to a central controller. The correlated data is arranged so that a map of the transport route can be displayed, showing the locations of the conditions.

In another embodiment of the present invention a system is used which includes at least one mobile sensing station mounted on a vehicle traversing a given transport route, a first communication system, and a central controller. The mobile sensing station includes means for continuously detecting occurrences of conditions along the transport route, means for receiving or detecting positional data, means for storing data, characteristics of the occurrences detected, as well as time and date data corresponding to each of the occurrences, means for correlating the positional data with corresponding occurrences of conditions, and first means for transmitting the correlated data in response to a triggering condition. The central controller includes means for receiving the correlated data via the first communication system, and means for displaying the correlated data so as to identify positions along the transport route at which the occurrences of the conditions are detected.

In another embodiment of the invention, a mobile communication system is provided in a mobile satellite system. The mobile satellite system includes a satellite communication switching office having a satellite antenna for receiving/transmitting a satellite message via a satellite from/to a vehicle using a mobile communication system, a satellite interface system, and a fleet management system including a central controller. The central controller receives/transmits the satellite message from/to the satellite communication switching office. The central controller maps occurrences of conditions along a transport route responsive to the satellite message received from the vehicle via the satellite and the satellite interface system. The conditions are detected using a mobile sensing station mounted on the vehicle traversing the transport route. Alternatively, the controller receives data in the satellite message received from the vehicle. The mobile communication system includes a housing having a shock resistant material. The housing includes end bumpers of an elastomeric material for absorbing shock experienced by the housing. The end bumpers each include recessed handles on an upper surface of the mobile communicator system and ribbed protruded finger grips on a bottom surface of the mobile communication system. The mobile communication system also includes an input device for inputting data. The input device comprises a keyboard including a rubber/carbon membrane and mounted in the housing using a first seal to prevent fluid from entering the mobile communication system between the input device and the housing. The mobile communication system also includes a central processing unit disposed in the housing that receives either data from the input device or sensor data received from the mobile sensing station. The sensor data includes condition data occurring along the transport route, positional data, and time and date data corresponding to each occurrence of the condition data. The central processing unit also outputs satellite data to the satellite interface system for transmission to the satellite. the mobile communication system further includes a display monitor comprised of tempered glass having the ability to withstand a predetermined impact. The display monitor is mounted in the housing using a second seal to prevent fluid from entering the mobile communication system between the display monitor and the housing.

In addition, the present invention includes a mobile communication system provided in a mobile satellite system. The mobile communication system includes a housing having a shock resistant material. The housing includes end bumpers of an elastomeric material for absorbing shock experienced by the housing. The end bumpers each include recessed handles on an upper surface of the mobile communicator system and ribbed protruded finger grips on a bottom surface of the mobile communication system. The mobile communication system also includes an input device for inputting data. The input device comprises a keyboard including a rubber/carbon membrane and mounted in the housing using a first seal to prevent fluid from entering the mobile communication system between the input device and the housing. The mobile communication system also includes a central processing unit disposed in the housing that receives data from the input device. The central processing unit also outputs satellite data to the satellite interface system for transmission to the satellite. The mobile communication system further includes a display monitor comprised of tempered glass having the ability to withstand a predetermined impact. The display monitor is mounted in the housing using a second seal to prevent fluid from entering the mobile communication system between the display monitor and the housing.

In another embodiment, the mobile communication system including a bracing system for protecting and securing the internal components. The bracing system includes an upper housing comprised of a shock resistant material. The upper housing includes a monitor cavity, elevated portions surrounding the monitor cavity and formed in the upper housing, and elastomer sections disposed on the elevated portions. In addition, the upper housing includes a breakage resistant transparent material placed on the elastomer sections and in conformity with the monitor cavity, a display monitor being protected by the breakage resistant material, and a shock absorbing material disposed around the peripheries of the breakage resistant transparent material and the display monitor. The shock absorbing material is mounted to at least one of the breakage resistant transparent material and the display monitor. The upper housing also includes a mounting bracket biasing the display monitor to the upper housing and the breakage resistant material, and mounted to the upper housing, an integral keyboard formed of a water resistant material including elevated keys and mounting holes arranged around the periphery and between selected keys, and a first printed circuit board including switches selectively activated in response to depression of the elevated keys and mounted to the upper housing through the mounting holes in the integral keyboard. The bracing system also includes a lower housing comprised of another shock resistant material. The lower housing includes a second printed circuit board including a central processing unit, and mounted to the lower housing, and a support mounted to the lower housing and extending in a direction toward the upper housing and through the second printed circuit board.

In another embodiment, a system for mapping occurrences of conditions along a transport route is provided. The transport route is travelled by a vehicle storing cargo. The system includes at least one mobile sensing station mounted on the vehicle traversing the transport route. The mobile sensing station detects occurrences of the conditions along the transport route to the vehicle. At least one of the conditions indicates that the vehicle is influenced by the conditions. The sensing station receives positional data, correlates the positional data with corresponding occurrences of the conditions, and transmits the correlated data. The system also includes a central controller that receives the correlated data from the mobile sensing station, determines responsive to the correlated data a position on the transport route at which the occurrences of the conditions are detected, and determines responsive to at least one of the position and the transport route, a party responsible for the condition or an appropriate party to be notified of the condition. The central controller optionally transmits to the responsible party an accountability report.

In another embodiment, a method of mapping occurrences of predetermined conditions along a transport route travelled by a vehicle storing cargo is provided. the vehicle is equipped with a mobile sensing station connected to a central controller via a communications system. The method includes the step of continuously detecting for occurrences of the conditions to the vehicle along the transport route. At least one of the conditions indicates that the vehicle is influenced thereby. The method also includes the steps of receiving positional data and correlating the positional data with data corresponding to the occurrences of the conditions producing correlated data, and transmitting the correlated data to a central controller. The method also includes the steps of determining, responsive to the correlated data, a position on the transport route at which the occurrences of the conditions are detected, determining, responsive to at least one of the position and the transport route, a party responsible for the condition or to be notified of same, and optionally transmitting to the responsible party an accountability report requiring resolution by the responsible party.

These and further objects and advantages of the invention will become more apparent upon reference to the following description, drawings and claims.

BRIEF DESCRIPTION OF THE DRAWINGS

FIGS. 14-1–14-2 are exploded views of the mobile communicator system;

BEST MODE FOR CARRYING OUT THE INVENTION

Figure 1:
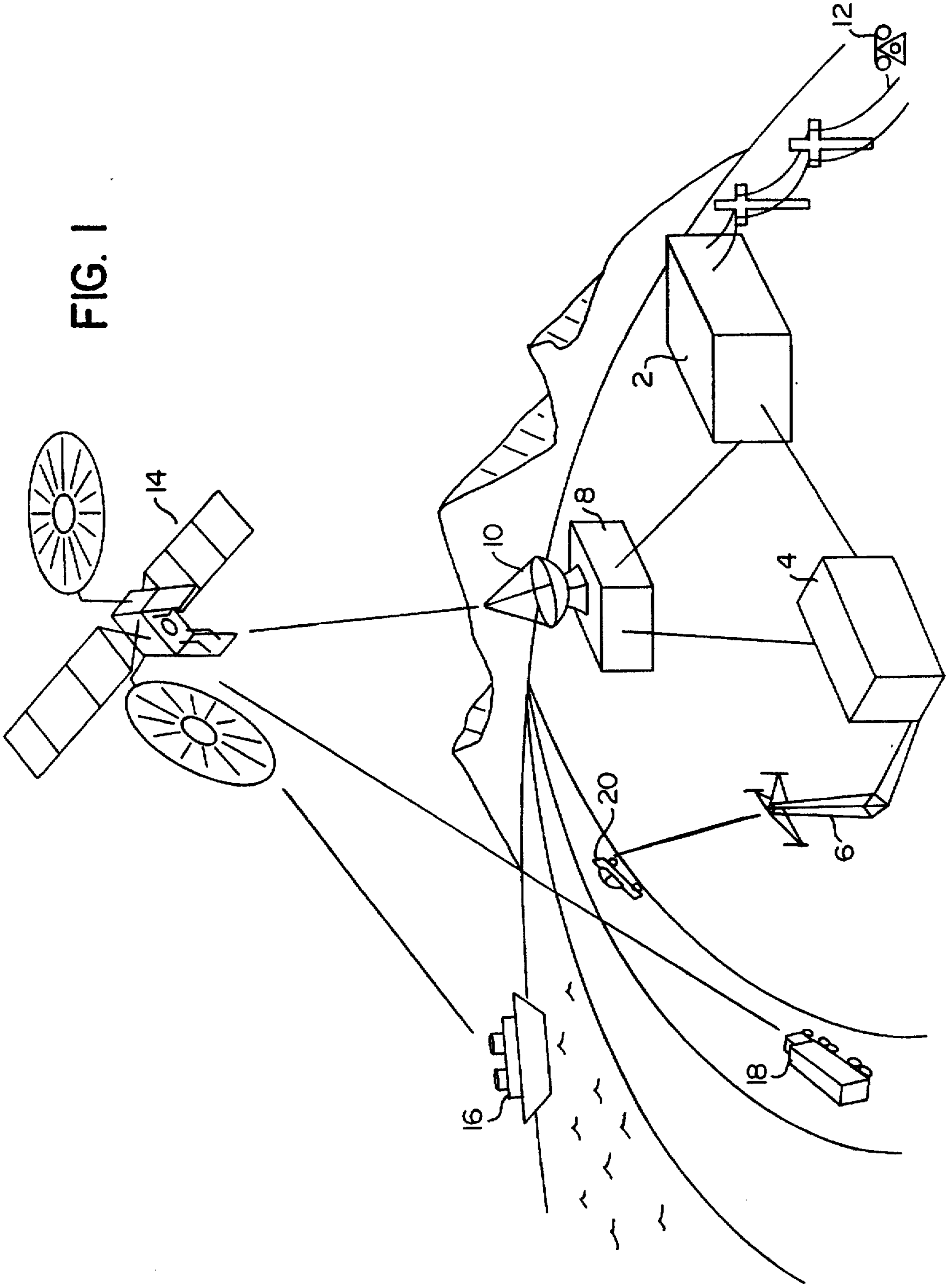
FIG. 1 is a diagram of the overall mobile communicator system.

FIG. 1 illustrates the general layout of a system for effectuating the present invention. A vehicle 18, usually transporting cargo, moves along a transport route. The route can be one that is well known, or it can be one that is being newly travelled by the vehicle. The vehicle is preferably equipped with at least one mobile sensing station, which functions to detect predetermined events or conditions (such as collisions or impacts, potholes or uneven tracks or the like) along the travel route, and transmit data regarding those conditions using the mobile communicator system (not shown) via orbiting satellite 14 to a remote satellite ground station 8 via satellite antenna 10. The satellite ground station 8 transfers the data received from the mobile communicator system to a dispatch or fleet management center to analyze and evaluate the data.

Part of the data transmitted from the mobile sensing station is positional data received or detected from satellite 14 or a separate satellite which is part of a satellite navigation system. Examples of presently available systems are LORAN or the current Global Position System (GPS).

Navigational data sent to the mobile sensing station preferably utilizes a Standard-C data protocol format, which is commonly used in the maritime industry. Experience has indicated that this is the most reliable method of sending navigational data from one mobile station to another. However, other navigation or location systems can be used. For example, a series of radio repeaters located along a predetermined route can track the location of a specific vehicle and can be used to send location data to the mobile communicator as is done by satellite 14 in FIG. 1. Also, other data transfer formats can be used, depending on the navigational system, the transport route, the vehicle and the communication system for transmitting data from the mobile communicator system.

While FIG. 1 illustrates communication between the mobile communicator system in vehicle 18 to satellite 14, the mobile communicator system may also communicate with the fleet management center by means of a cellular telephone system. In this variation, the mobile communicator system carries a cellular transceiver capable of automatically accessing cellular ground station 4 as it passes from one cell into another. While such equipment may be more complex and expensive than the satellite uplink embodied in FIG. 1, it facilitates easy communication of instructions from the central controller to the mobile sensing station. Currently available examples of dual cellular and satellite communication systems include, for example, Westinghouse Series 1000 satellite/cellular mobile telephone or Mitsubishi DiamondTel Series satellite/cellular mobile telephone.

The fleet dispatch center includes a central controller that stores the data sent from the mobile communicator system and arranges it so that it can be used in a display indicating the occurrence of conditions along the route travelled, for example, by vehicle 18. The central controller is expected to handle data from a variety of routes, each travelled by a plurality of vehicles having mobile sensing stations. Since the data are preferably transmitted from the mobile communicator system in ASCII format, the user terminal can access selected data from the central controller using a personal computer (PC), a modem and standard communication software.

With the appropriate software, a display of the desired transport route can be generated at the PC terminal, and the conditions along the transport route can be updated as information is received from various vehicles having mobile communicator systems travelling along that route. For example, boat 16 in FIG. 1 also includes a mobile communicator system for communication with satellite 14. In addition, even vehicles or subscribers who do not contain the mobile communicator system can communicate with the mobile communicator system. For example, vehicle 20 may communicate with satellite 14 via cellular antenna 6, cellular switching office 4, satellite ground station 8 and satellite antenna 10. Similarly, plain old telephone service (POTS) telephone 12 may also communicate with satellite 14 via switching office 8, satellite ground station 8 and satellite antenna 10. Thus, the mobile communicator system may be used to exchange data from among various different vehicles.

Figure 2A:
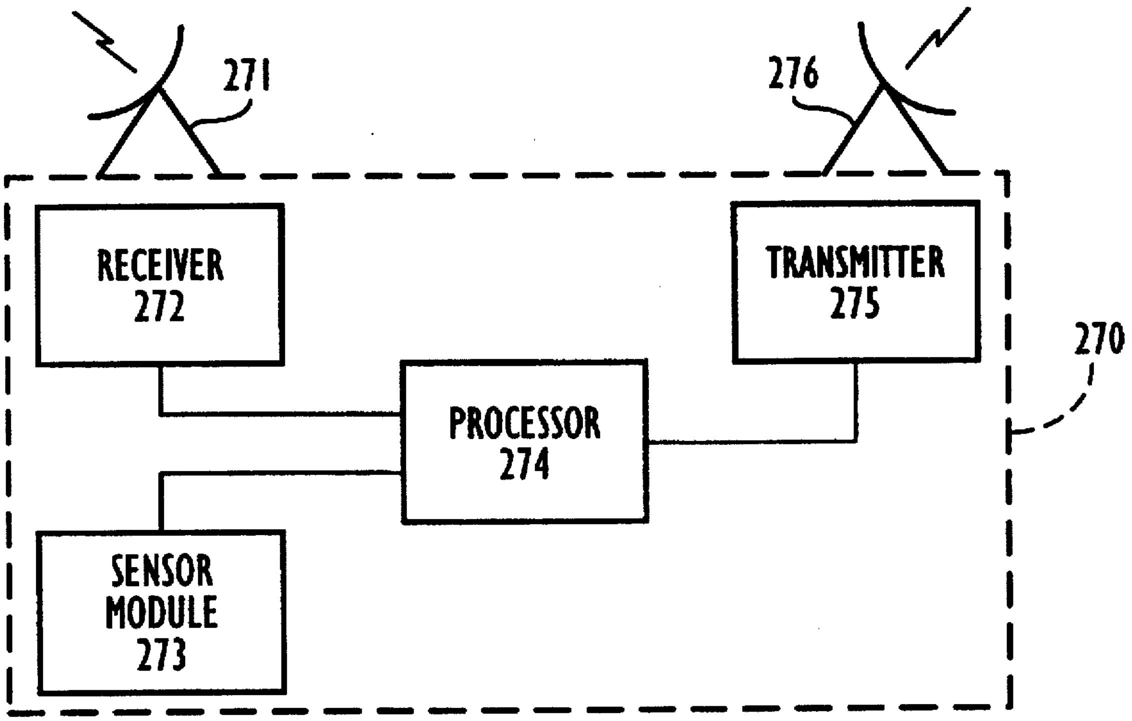
FIG. 2A is a block diagram illustrating the basic electrical elements contained in the mobile communicator system.

FIG. 2A illustrates one example of a mobile sensing station 270. Antenna 271 is used to receive navigational data from a navigational system such as LORAN-C. The data is demodulated in receiver 272 so that it can be stored and/or operated on by processor 274. The navigational data is correlated with the appropriate occurrences of the conditions detected by sensor module 273. The processor also correlates time and date information to the appropriate data corresponding to the occurrence of conditions detected along the transport route.

Sensor module 273 can be of a single sensor type or of a plurality of different types connected so that indication of a variety of conditions can be transmitted to processor 274. The sensor modules can be located as part of the mobile sensing station package or can be remotely located throughout the vehicle. The sensors can be used to detect a variety of different vehicle conditions, transport route conditions, and cargo conditions. In one embodiment, the sensor module includes an accelerometer capable of three-axis measurement of acceleration vs. time. In many cases, this is the only sensor data that is needed to determine if transport route conditions are appropriate for the cargo being transported.

After correlating the location data from receiver 272 and the sensor 273, data processor 274 sends the correlated data to transmitter 275 which transmits the correlated data to the satellite 14 via antenna 276. It is a feature of the invention that a transceiver can be substituted for transmitter 275 so that the satellite system can accommodate transmission of data from satellite 14 (in FIG. 1) to the mobile sensing station. One such system capable of providing such operation is the satellite communication system operated by American Mobile Satellite Corporation, through its subsidiary, AMSC Subsidiary Corporation, which may be used to facilitate one embodiment of the present invention.

In one illustrative embodiment wherein a three-axis accelerometer is used, the system has the capability of recording acceleration transients on each measurement axis which exceed a factory preset value of 3Gs as a trigger threshold, and which occur within a 256 millisecond time window. The system records the highest acceleration level reached during this time window, and the exact date and time at which it occurred. The system continues to operate in this fashion until either it has accumulated a total of 248 peak readings or is interrupted for data download by a remote host terminal such as the central controller. This particular version of the mobile sensing station may be constituted by a ride recording device such as or similar to the environmental data recorder manufactured by Instrument Sensor Technology in Lansing, Mich. The accelerometers in this type of device have a measurement range of 0 to ±10 g, and a resolution of ±0.4 g. The mobile sensing station is preferably provided with a standard RS-232 serial communication interface with command protocol supplied for customer integration with the host terminal computer for control and data transfer.

While the mobile sensing station 270 may be triggered as described in the previous paragraph, other modes of triggering may also be accomplished. For example, the transmission of data can be triggered by a single occurrence of the conditions, or by some combination of conditions. Triggering may also occur periodically regardless of the number or types of detected conditions. In the embodiment wherein a transceiver is substituted for transmitter 275 and the communication system between the central controller and the mobile sensing station provides continuous communication, a control signal from the central controller may be transmitted to antenna 276, received by transmitter 275, and used to trigger processor 274.

It is not necessary that the location data be transmitted at the same time as the data regarding the occurrences of the conditions. Under some system conditions, data regarding the occurrence of the conditions may be sent as soon as the triggering operation occurs, and a proximity position report may follow within a few minutes. The coordination between the two types of data may be adjusted by processor 274 based upon system parameters and other operating requirements as are necessary to provide a real-time data input of transport route conditions. For example, the second-by-second correlation of positional data with data regarding the conditions is not critical in a railway switching yard since the vehicle spends a substantial amount of time in the same location while being switched. On the other hand, a vehicle travelling at high speed along a transport route which may be unfamiliar will require positional data to be closely correlated with that of the conditions detected along the transport route.

Figure 2B:
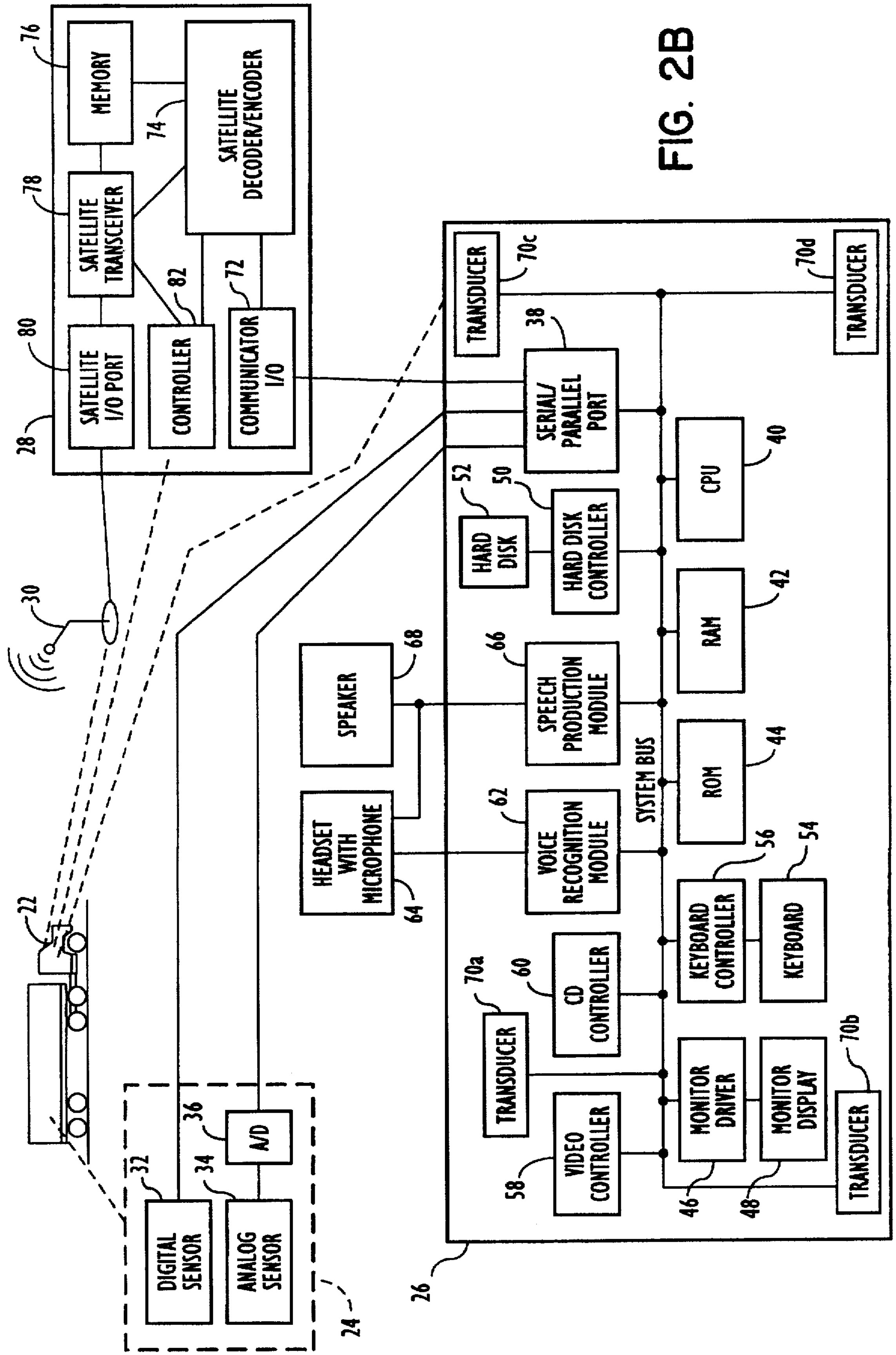
FIG. 2B is a block diagram illustrating the elements contained in a mobile communicator system for one preferred embodiment of the present invention.

FIG. 2B is a block diagram illustrating the elements contained in the mobile communicator system in more detail and in accordance with one preferred embodiment. In FIG. 2B, sensor module 24 located in vehicle 22 can be of a single sensor type or of a plurality of different types connected so that indication of a variety of conditions can be transmitted to mobile communicator 26. For example, sensor module 24 preferably includes digital sensor 32 and analog sensor 34. Analog sensor 34 is equipped with analog to digital (A/D) converter 36 which converts the analog signals into digital signals for transmission to mobile communicator system 26.

Sensor module 24 can be used to detect a variety of different vehicle conditions, transport route conditions, and cargo conditions. In one embodiment, the sensor module 24 includes an accelerometer capable of three-axis measurement of acceleration vs. time. In many cases, this is the only sensor data that is needed to determine if transport route conditions are appropriate for the cargo being transported.

In one design, mobile communicator system 26 receives the sensor data from sensor module 24 and correlates the data for transmission to the satellite. In another alternative, the sensor module 24 includes processing capability for correlating and determining when such collected information is to be transmitted to a receiving station. Mobile communicator system 26 includes input/output serial/parallel port 38 for receiving the sensor data from sensor module 24, and for outputting the correlated sensor data to satellite interface system 28. In addition, serial/parallel port 38 also receives and transmits other data which may be exchanged between the mobile communicator system 26 and, for example, a fleet dispatch center, via the satellite. Data to be transmitted to and received from the satellite may be displayed on display 48 via monitor driver 46. The data may also be printed to a printer connected to the parallel port of serial/parallel port 38, or broadcasted on speaker 68 via speech recognition module 66. Mobile communicator system 26 also includes video controller 58 for display of data on an external monitor.

Data is entered in the mobile communicator system 26 via, for example, any one of keyboard 54 using keyboard controller 56, microphone 64 using voice recognition module 62, hard disk 52 via hard disk controller 50, or via an external compact disk via compact disk controller 60. Each of the various devices are connected to central processing unit (CPU) 40 via the system bus.

CPU 40 performs the processing or operations of mobile communicator system 26 as described above. CPU 40 is conventional, and may be, for example, an IBM compatible 286 or 386 type processor with between 640K -2 MB of random access memory (RAM) and from 20–50 MB of read/write/delete storage such as a standard hard disk 52. CPU sends the correlated data to satellite interface system 28 which transmits the correlated data to the satellite via antenna 30. It is a feature of the invention that a transceiver can be used for transmitting the data.

It is not necessary that the location data be transmitted at the same time as the data regarding the occurrences of the conditions from the mobile communicator system 26 to the satellite. Under some system conditions, data regarding the occurrence of the conditions may be sent as soon as the triggering operation occurs, and a proximity position report may follow within a few minutes. The coordination between the two types of data may be adjusted by CPU 40 based upon system parameters and other operating requirements as are necessary to provide a real-time data input of transport route conditions. For example, the second-by-second correlation of positional data with data regarding the conditions is not critical in a railway switching yard since the vehicle spends a substantial amount of time in the same location while being switched. On the other hand, a vehicle travelling at high speed along a transport route which may be unfamiliar will require positional data to be closely correlated with that of the conditions detected along the transport route.

Satellite interface system 28 receives data from the mobile communicator system 26 via communicator input/output port 72. The received data are then encoded in accordance with predetermined formats which are compatible for the different satellites orbiting the planet earth via satellite encoder/decoder 74. Satellite encoder/decoder 74 also compresses the data to maximize the efficiency of the communication between the satellite interface system 28 and the satellite. Memory 76 may be used to temporarily store the data which is encoded and compressed prior to transmission via satellite transceiver 78, satellite input/output port 80, and antenna 30. The various operations in satellite interface system 28 are coordinated and controlled by controller 82. Satellite interface system 28 may be comprised of any standard satellite interface system, such as the Trimble Galaxy Inmarsat Land Mobile Transceiver manufactured by Trimble Navigation of Sunnyvale, Calif. Additional interface systems are described in U.S. Pat. Nos. 4,884,208; 4,258,421; The Electronic Motorist, IEEE Spectrum, pp. 37–48 (March 1995); and Remote Sensing, IEEE Spectrum pp. 24–31 (March 1995); all incorporated herein by reference.

Advantageously, in accordance with the discovery of the present invention, the mobile communicator system 26 preferably includes sensors, such as transducers **70*a*–70*d*. Transducers 70*a*–70*d* are used to determine the external conditions experienced by the mobile communicator system 26. Transducers 70*a*–70*d* are strategically placed to record, for example, shock or improper handling of mobile communicator system 26. The data generated from transducers 70*a*–70*d* are then transmitted to, for example, the fleet management center via satellite interface system 28 and the satellite in a similar manner as the data from the sensors in the vehicle described above. Thus, in accordance with the discovery of the present invention that the mobile communicators receive rough handling due to external conditions, mobile communicator system 26 includes transducers 70*a*–70*d* to determine when occurrences of these adverse conditions occur. The data may then be analyzed, for example, by the fleet management center or the mobile communicator system 26 itself to determine when such external conditions have occurred to assist in determining corrective measures to be taken to ensure the safe or correct handling of the mobile communicator system 26**.

Mobile communicator system 26 also includes unique mechanical features which are described in greater detail below. These unique mechanical features provide additional protection for the mobile communicator system 26 in addition to the mobile communicator sensors.

Antenna 30 may be any standard satellite antenna such as the standard C & GPS antenna manufactured by Trimble Navigation of Sunnyvale, Calif. which is generally mounted directly to the vehicle. Alternatively, antenna 30 may be mounted to the vehicle using the antenna mount illustrated in FIG. 11.

Figure 11:
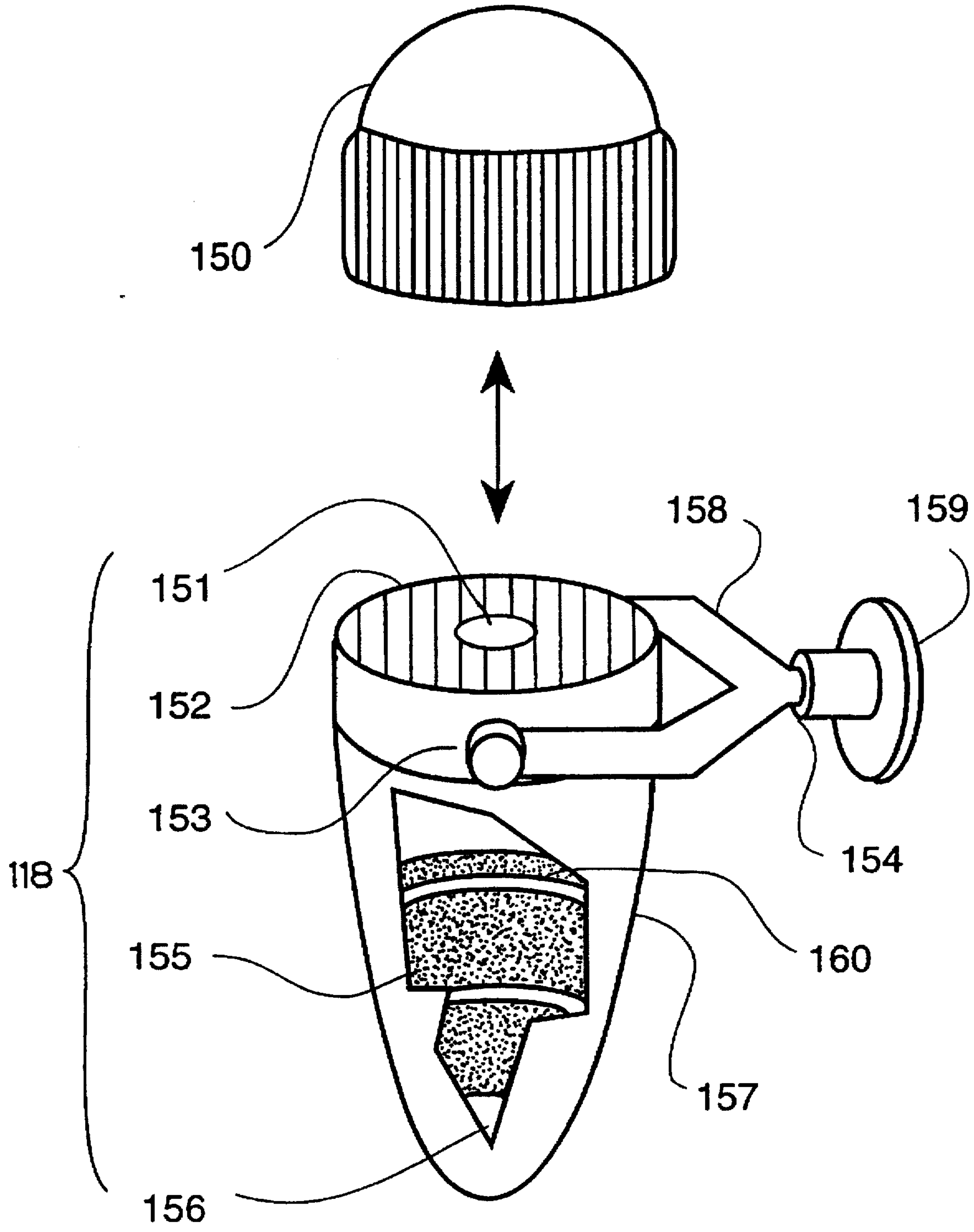
FIG. 11 is a diagram of an antenna mount used with the mobile communicator system.

In FIG. 11, radome 150 is shown in exploded view from ballast assembly 118. Radome 150 houses the satellite antenna 30 of the present invention. Mounting plate 152 on ballast assembly 118 is provided with female threaded portion 151 for receiving radome 150. Female threaded portion 151 may comprise, for example, a 5/16–18 threaded hole.

Mounting plate 152 is attached to housing 157 of ballast assembly 118 which is mounted to yoke 158 via pitch gimbal 153. Mounting yoke 158 is attached to mounting bracket 159 via roll gimbal 154. Housing 157 contains weight 156 located at the bottom of housing 157. In the preferred embodiment, weight 156 comprises a lead weight, although other types of materials may be used which provide suitable mass. Within housing 157 lies dampening fluid 155, which may comprise a viscous fluid such as glycol.

The dampening characteristics of dampening fluid 155 are carefully chosen to provide the correct dampening for the antenna mount of FIG. 11. In addition, dampening fluid 155 is selected to provide a fluid which has appropriate freeze temperature characteristics so that dampening fluid 155 will not solidify in normal use. Further, dampening fluid 155 is selected such that the fluid has a relatively constant viscosity characteristics with respect to temperature.

In an alternative embodiment, pitch gimbal 153 and/or roll gimbal 154 may be provided with additional shock absorption devices. These devices may take the form of pneumatic or hydraulic dampeners or friction disks inserted in gimbal joint 153, 154 to dampen movement. In the preferred embodiment, a pneumatic dampener, such as an Air-Pot™ may be used at the rotational joints of gimbals 153, 154. Alternately, hydraulic or pneumatic dampeners 970 may be externally mounted. Friction disks may be inserted in gimbal joints 153, 154 with tension maintained on the disks my means of a spring mechanism (e.g., belleville washers or the like) so as to provide a predetermined friction within gimbal joint 153, 154. Alternately, other types of mechanical or hydromechanical dampening units known in the art may be applied to gimbal joints 153, 154. These shock absorption devices may be supplied to supplement dampening fluid 155 to aid in the dampening of large accelerations. During large accelerations, the dampening fluid 155 may tend to remain at the bottom portion of antenna mount 118 due to centripetal acceleration. The use of external shock absorbers delays the motion of antenna mount 118, causing displacement of dampening fluid 155 so as to establish the free-surface effect described below. Alternately, these additional shock absorption devices may serve to eliminate or substantially reduce movement of the antenna mount due to minor shocks or vibrations.

Housing 157 may be provided with a series of annular rings 160. Annular rings 160 are provided to alter the dampening action of dampening fluid 155 by providing additional surface area to housing 157 to interact with dampening fluid 155. For the sake of illustration, the antenna lead cable is not shown in FIG. 11. A suitable length of flexible lead cable, for example, may be provided to connect the antenna to shipboard communications equipment. Alternately, a coiled, flexible cable may also be used. In addition, the antenna unit may be self-contained, for example, for use as a self-powered emergency beacon. Finally, as would be readily apparent to one of ordinary skill in the art, contact brushes may be used at the gimbals in order to provide suitable electrical connections for the antenna. Any suitable technique may be used such that the antenna lead does not interfere with the movement of the antenna mount or act to alter the dampening of the system.

Figure 12:
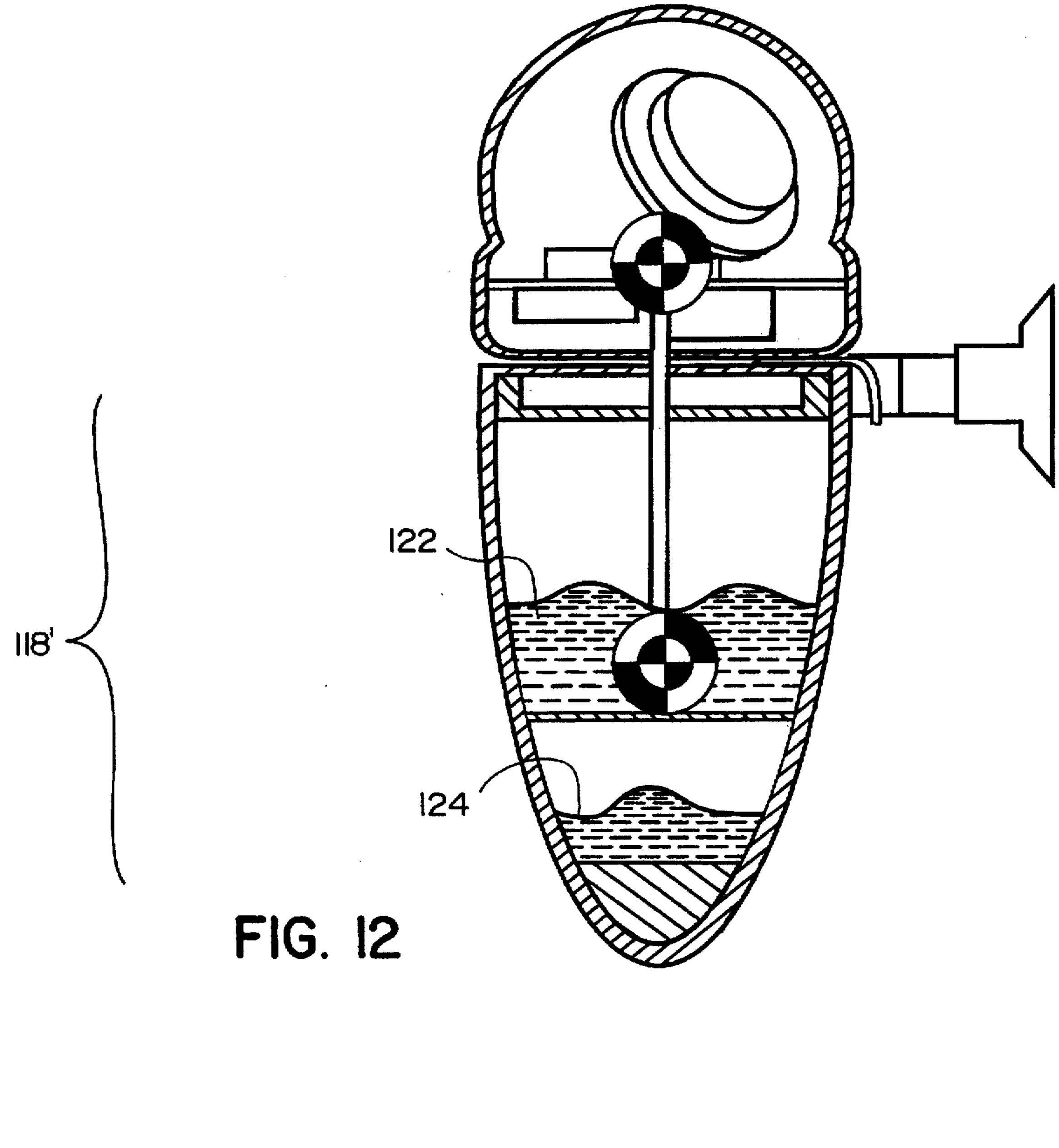
FIG. 12 is a diagram of an antenna mount used with the mobile communicator system.

FIG. 12 is a diagram of another antenna mount used with the mobile communicator system having similar construction as the antenna mount in FIG. 11. In FIG. 12, however, two separate fluid ballast compartments 122 and 124 are provided in ballast portion 118'. FIG. 12 shows an antenna which may be a directional or omnidirectional, mechanically or electronically steered antenna unit. The antenna has one center of gravity while the ballast portion 118' including the housing, dampening fluids, etc. has another center of gravity.

Although in the embodiment of FIG. 12 shows only two fluid ballast compartments 122 and 124, an additional number of fluid ballast compartments may also be used, stacked vertically. These ballast compartments may or may not contain annular baffles 160 shown in FIG. 11.

Both FIGS. 11 and 12 include a ballast weight comprised of a suitably dense material such as lead. Dampening fluids disposed in the fluid chambers preferably comprise a fluid in the viscosity range of 6 to 1000 centipoise, having a specific gravity range of 0.6 to 2.23 grams per centimeter squared. Both the specific gravity and viscosity of dampening fluids should be relatively constant over a broad temperature range (e.g., −40° C. to 100° C.) or at least remain within the above limits over this temperature range. Additional details of the above antenna mount in FIGS. 11 and 12 are disclosed in copending application Ser. No. 08/058,079 filed May 10, 1993, incorporated herein by reference. Alternatively, the antenna mounts in FIGS. 11 and 12 may also include a ballast tank containing fluid above the fulcrum point of the antenna mount, e.g., above gimbal joints 153, 154 in FIG. 11.

Figure 13:
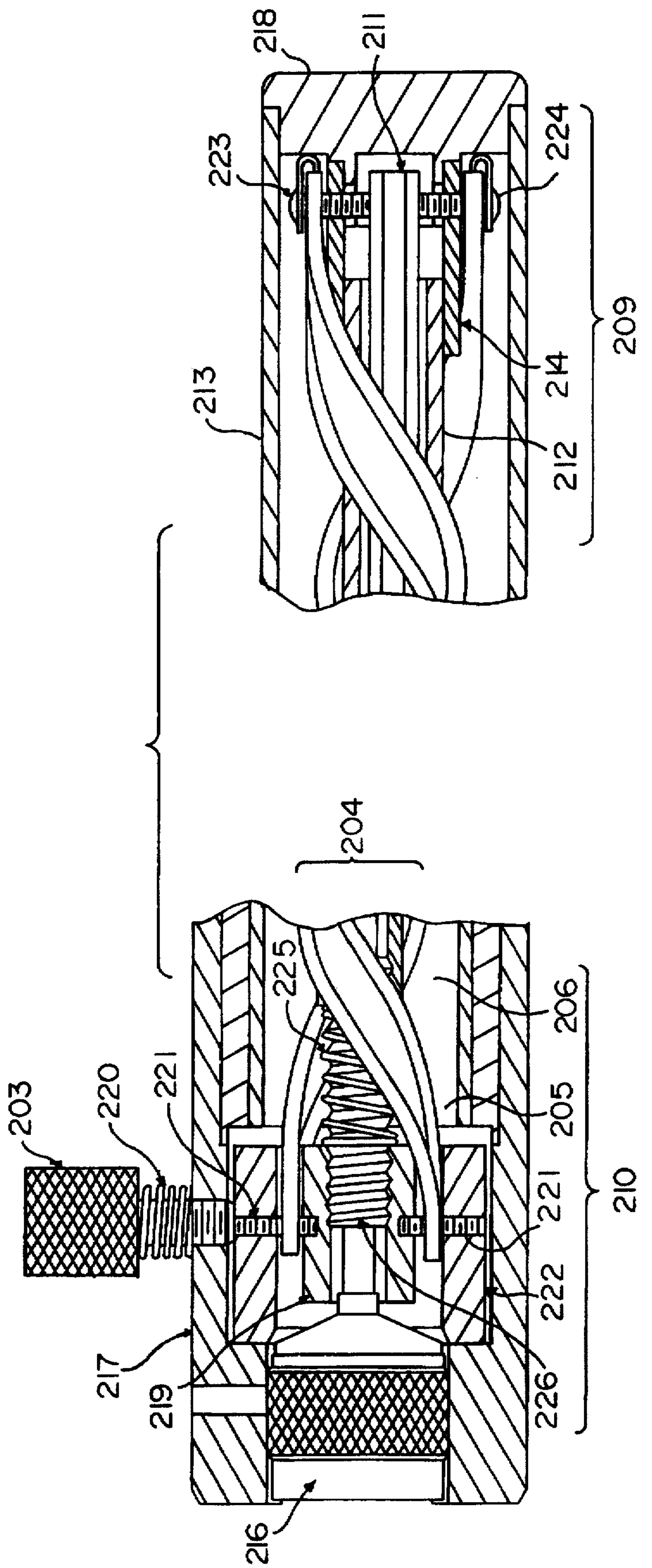
FIG. 13 is a diagram of an antenna used with the mobile communicator system.

FIG. 13 is a diagram of an antenna which may be used with the mobile communicator system. FIG. 13 shows a multi-turn bifilar helix antenna (hereinafter "antenna") using a mechanical design which permits the pitch and diameter of helix elements 205 and 206 to be adjustable. This mechanical adjustment elicits an electrical response in the radiation characteristics of the antenna which permits beam steering of the radiation pattern in the elevation plane. The antenna is capable of scanning its main radiation beam from 20° to 60° in elevation while maintaining relatively omnidirectional coverage in azimuth.

A range of 20° to 60° is particularly suitable for use in the CONUS, as this range of elevation corresponds to the angles of inclination between a geostable satellite and locations throughout the CONUS. Other ranges of angles could, of course, be used if the antenna is to be used in another country or countries. A narrower range could be used in applications where the mobile vehicle is anticipated as having a limited range of travel. A fixed elevation angle could be chosen for stationary antennas or antennas used in local mobile applications. At the other extreme, an adjustment range could be provided from 0° (horizon) to 90° (zenith) to provide global coverage. The preferred range of 20° to 60° is shown here for use in the CONUS and is in no way intended to limit the scope of the invention.

The antenna is designed to mount to a detachable base 201 located on the vehicle skin (e.g., trunk, fender, roof or the like) 202. Its scanned radiation angle is set manually by the vehicle operator with the relatively simple adjustment of a knurled sleeve 222 at the base 217 of the antenna.

Bifilar helix 204 comprises two helix elements 205 and 206 separated 180° apart, but sharing a common axis. In the preferred embodiment, helix elements 205 and 206 have conductors made of a highly conductive material, such as copper. Helix elements 205 and 206 serve as the radiating portion of the antenna. Helix 204 has distal end 209 and proximal end 210. In general, the distal end 209 of the vertically mounted antenna is the end which is furthest from the ground plane formed by vehicle skin 202. The antenna is fed at distal end 209 with a balanced assembly comprising coaxial cable section 211 terminating in a balun 214. This distal feed technique is sometimes referred to as the backfire mode.

Helix elements 205 and 206 are formed by being wound around a constant diameter tube to form a uniform helix. The angle of pitch of helix 204 is determined by the number of helix turns for a given axial length. Pitch in unit length is defined as the axial length required for the helix to make one complete turn about its axis. When helix elements 205 and 206 are wound 180° apart as suggested above, a criss-cross effect of the elements is observed when the structure is viewed from the side.

The spacing (helix diameter) and angle of pitch of helix 204 determines the polarization and radiation characteristics of the antenna. A bifilar helix with left-handed helices (ascending counter-clockwise as viewed from the bottom) radiates a right-hand circularly-polarized (RHCP) wave which is relatively omni-directional in azimuth. If the pitch angle and or the diameter of helix 204 is increased from an initial reference point, the radiation in elevation is scanned towards the horizon. In the present invention, the element pitch angle and helix diameter are adjusted by varying the number of helix turns for a fixed axial length.

In one embodiment, helix elements 205 and 206 are made from 300 ohm twin lead line commonly used in FM receivers and some television leads. One of the conducting leads is removed from the polypropylene sheathing of each of helix elements 205 and 206, while the remaining lead serves as the radiating element. Thus, helix elements 205 and 206 each contain only one wire.

Polypropylene was chosen because it readily takes a helix shape when wrapped around a metal tube (not shown) and heated with a hot air gun. Other heating techniques can also be used including heating the metal tube itself. Helical elements 205 and 206 may be formed from two 37 inch lengths of 300 Ohm twin lead line suitably modified as discussed above by stripping one of the leads from the sheathing. When wound six and one-half times around a ⅝ inch diameter tube, helical elements 205 and 206 are formed at an axial length of about 31 inches.

Formed helix elements 205 and 206 are placed over a 31 inch long ⅜ inch diameter hollow supporting tube 212 which may be made of any fairly robust insulating material such as phenolic resin. Supporting tube 212 is centrally located within a 32 inch long outer sheath 213 which is one inch in diameter. Outer sheath 213 also may be formed of any robust insulating material such as polycarbonate and serves to provide environmental sealing of the antenna assembly. Coaxial cable 211 is fed through the center of supporting tube 212 and is terminated at the distal end 209 at balun 214. Coaxial cable 211 may be formed from a UT141 semi rigid coaxial line.

Balun 214 comprises a hollow 3/16 inch diameter brass tube with two feed screws 223 and 224 located 180° apart. The wire portions of Helix elements 205 and 206 are secured to the termination of balun 214, one on each side, by feed screws 223 and 224. Proximal end 210 of coaxial line 211 is terminated by connector 216 which may be press fitted into base 217 of the antenna. Balun 214 serves to maintain a relative phase difference of 180° between the radiating elements for the required frequency bands.

In an alternative embodiment, balun 214 comprises a hollow 3/16 inch diameter slotted brass tube with two slots in the tube located 180° apart. The slots are 0.124 inches wide by 1.85 inches long. The wire portions of Helix elements 205 and 206 are soldered to the termination of balun 214, one on each side, separated by the slots.

Support tube 212 is captured at distal end 209 by end cap 218 set into distal end 209 of outer sheath 213 so as to prevent support tube 212 from rotating. End cap 218 is secured to distal end 209 of outer sheath 213 by glue, screws, threading, press fit, or the like.

Proximal end 210 of support tube 212 is movably attached to inner rotatable sleeve 219 by threaded member 226. Threaded member 226 may be, for example, a ¼-20 threaded stainless steel sleeve. Spring 225 is installed at the point of rotation between support tube 212 and inner rotatable sleeve 219 to prevent undesired relative movement between inner rotatable sleeve 219 and support tube 212. Spring 225 may be made of, for example, stainless steel. Inner rotatable sleeve 219 is held in place by two set screws 221 within knurled adjustment outer sleeve 222. Inner sleeve 219 and outer sleeve 222 are located within base 217 which supports outer sleeve 213 and connector 216. The two grounded ends of helix elements 205 and 206 are attached to rotating set screws 221, creating a mechanism for changing helix pitch. Access to knurled outer sleeve 222 is made by machining two window slots (not shown) in the base 217. Base 217, inner sleeve 219 and outer sleeve 221 may be made from any suitable insulating plastic material with requisite strength requirements, such as DELRIN (TM) plastic.

Helix 204, preferably made of polypropylene, has the desirous property of maintaining a uniform pitch along its axial length, even when one end is rotated with respect to the other. By fixing proximal end 209 of helix elements 205 and 206 from rotation to balun 214 and attaching proximal ends 210 of helix elements 205 and 206 to rotatable outer sleeve 222, an elevation steerable antenna with fixed height and adjustable pitch is achieved.

In operation, the operator loosens knurled locking bolt 203 (held firm by spring 220) and twists knurled outer sleeve 221 through the two window slots (not shown) to adjust the axial pitch of antenna 200. In its initial position, helix elements 205 and 206 make approximately six and one-half turns within the axial length of antenna 200. This allows for coverage within 20° above the horizon. In the other extreme, helix elements 205 and 206 make just under ten complete turns, allowing for coverage up to 60° above the horizon. A mechanical limiter (not shown) and elevation angle indicator (not shown) are used to prevent the user from forcing the helix elements beyond their six and one-half and ten turn limits and to simplify the process for optimizing the antenna for elevation coverage. The operator's choice of elevation angle can be determined from the latitude where the vehicle is located, or can be positioned with the aid of a standard electronic antenna peaking device. Additional details of the above antenna in FIG. 13 are disclosed in copending application Ser. No. 08/187,996 filed Jan. 28, 1994, incorporated herein by reference.

Figure 3:
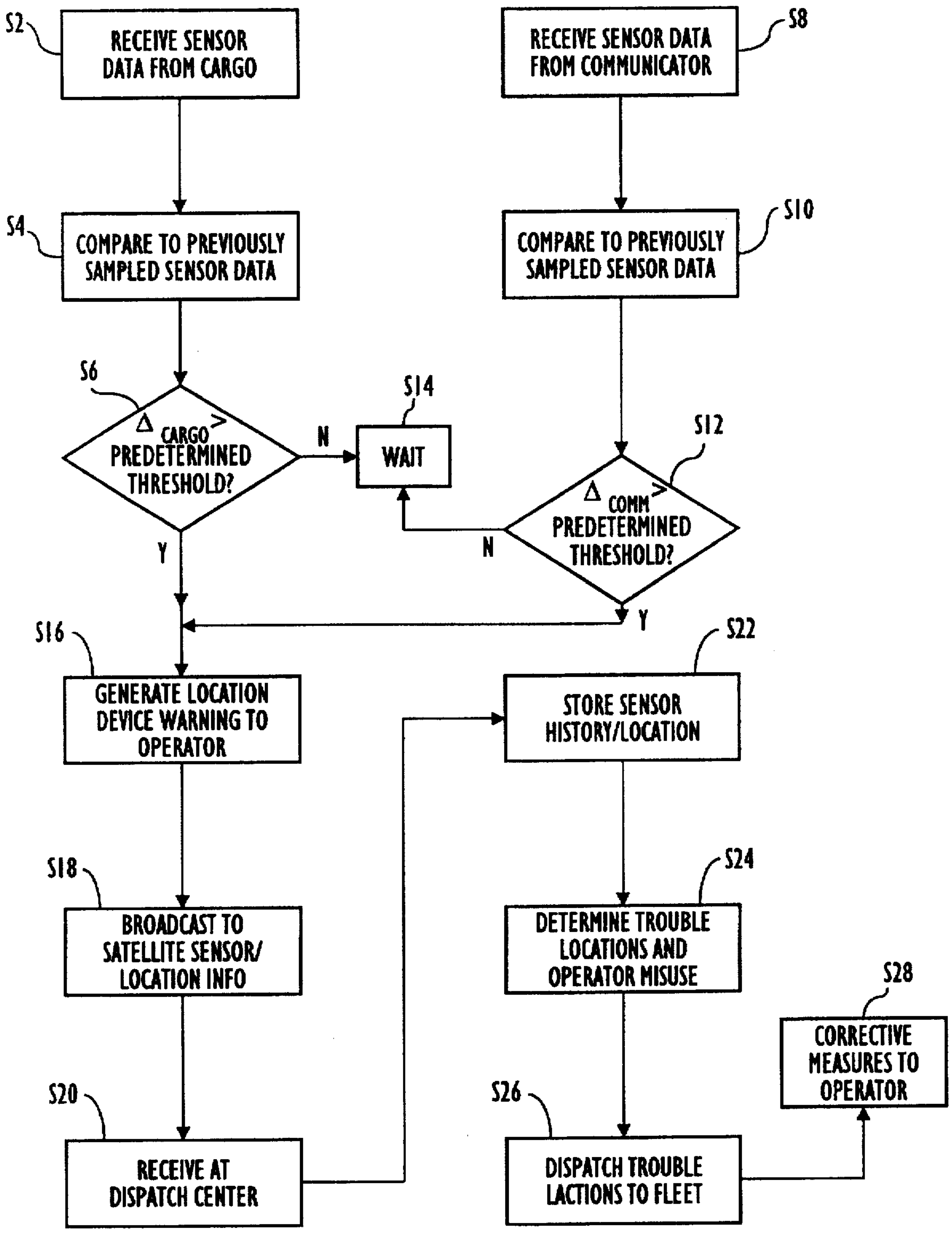
FIG. 3 is a flowchart illustrating the process implemented by the mobile communicator system.
Figure 4:
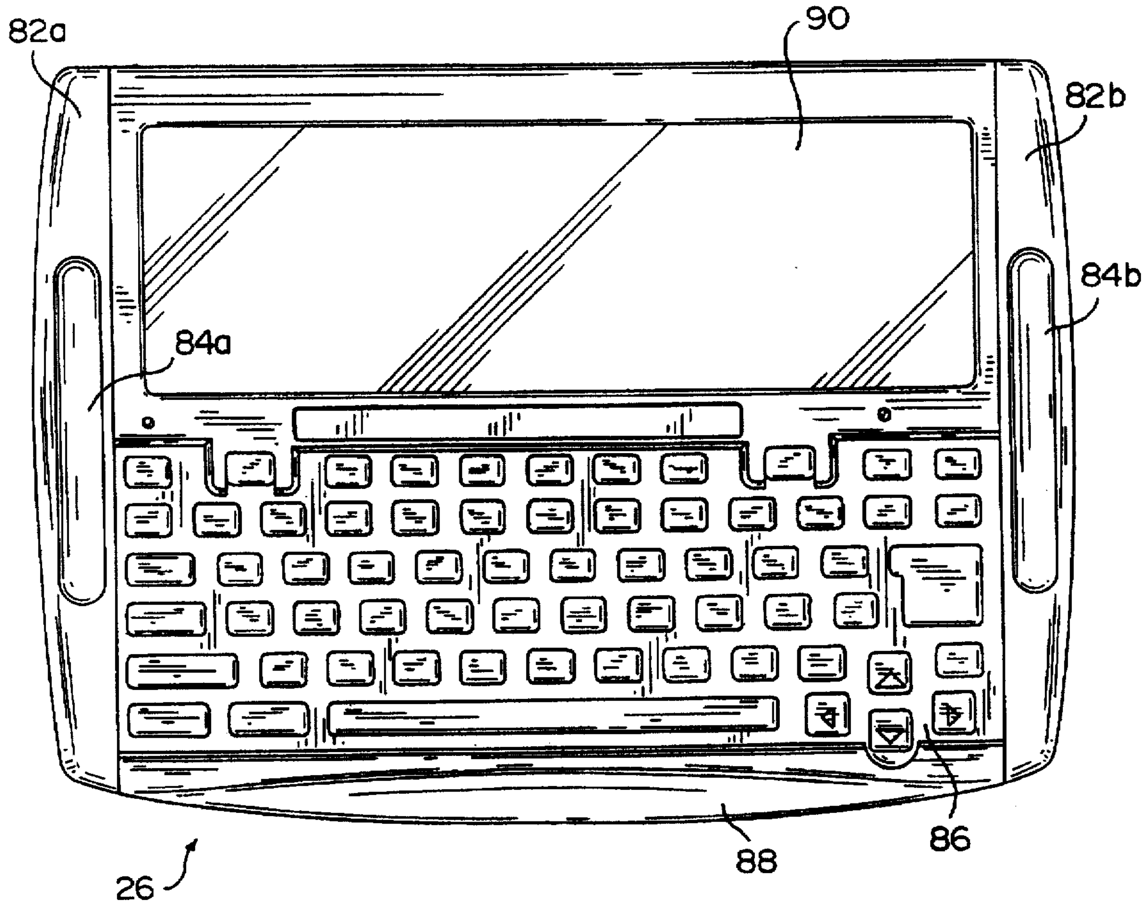
FIG. 4 is a top plan view of the mobile communicator system.
Figure 5:
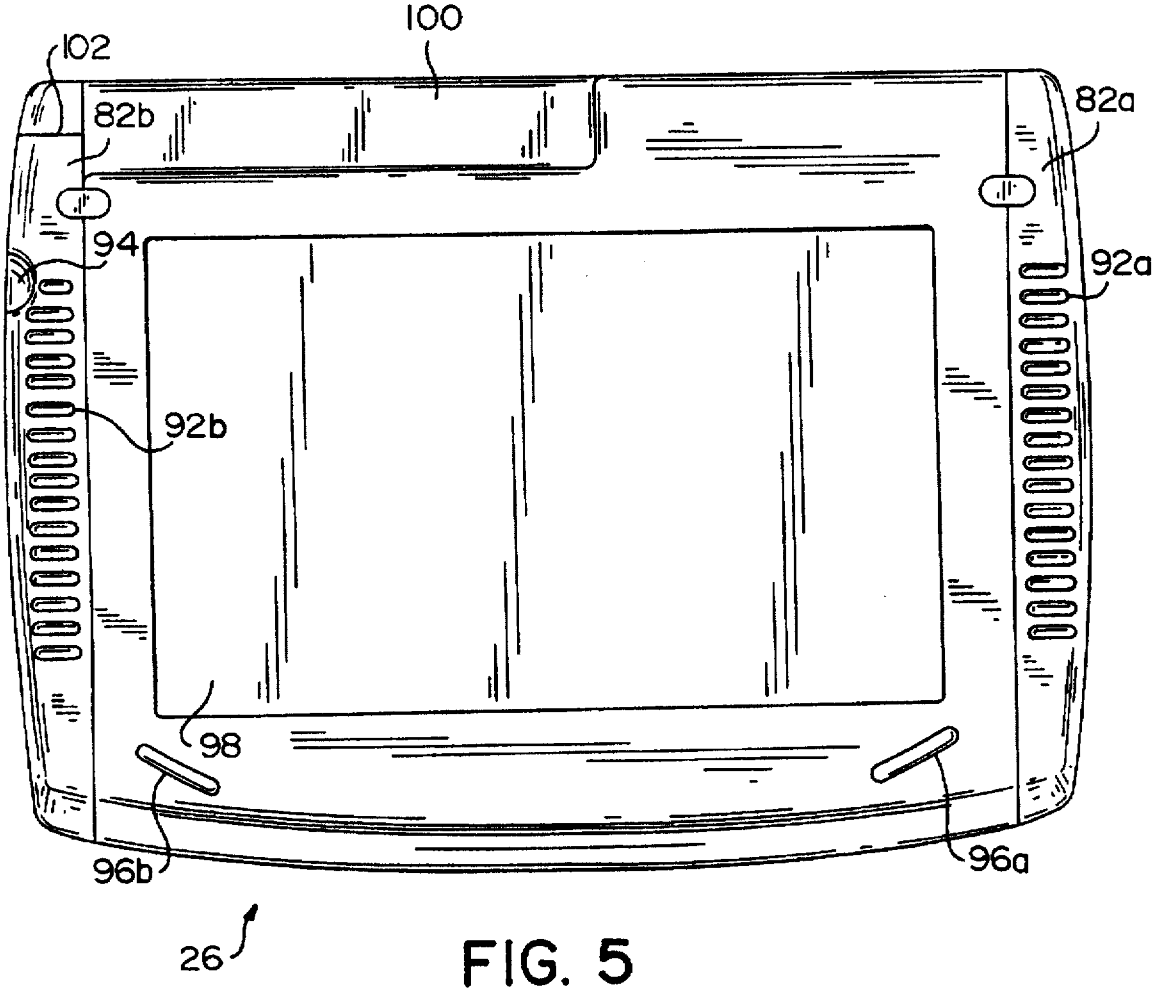
FIG. 5 is a bottom plan view of the mobile communicator system.
Figure 6:
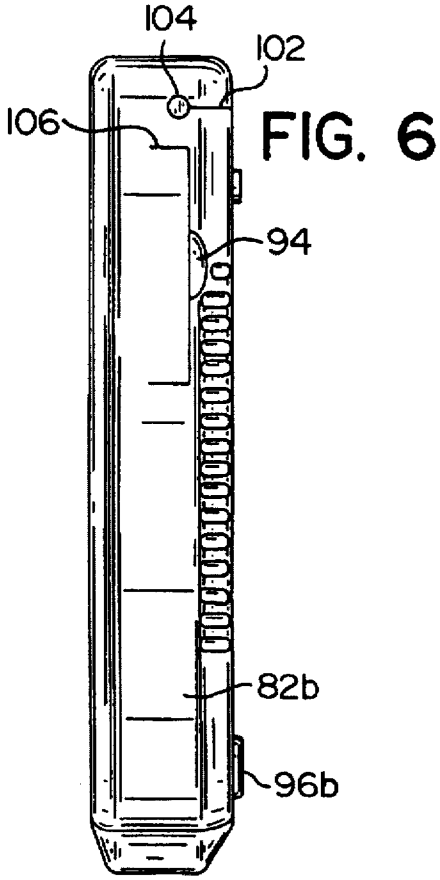
FIG. 6 is a right side elevational view of the mobile communicator system.
Figure 7:
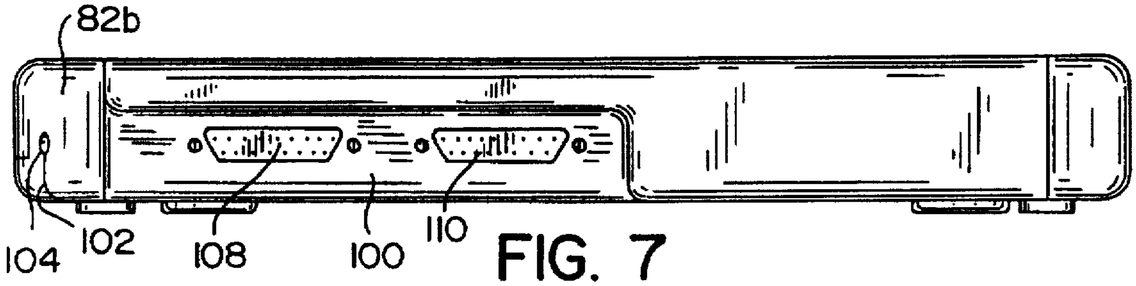
FIG. 7 is a rear elevational view of the mobile communicator system.
Figure 8:
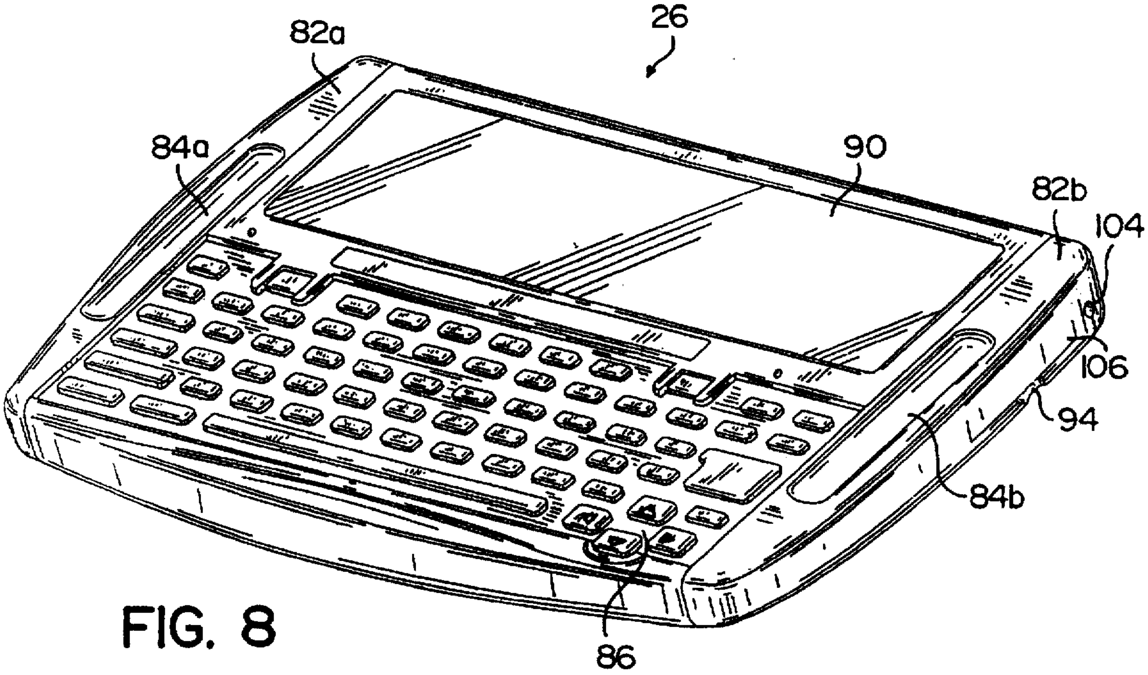
FIG. 8 is a perspective view of the mobile communicator system.

FIG. 3 is a flow chart illustrating the process implemented by the mobile communicator system. In FIG. 3, the mobile communicator system 26 receives sensor data from, for example, sensors located in the cargo area of vehicle in step S2. Mobile communicator system 26 then compares the previously sampled sensor data to the current sensor data in step S4, and determines whether or not the change in the data exceeds the predetermined threshold indicating that a significant change in the data has occurred in step 56.

Mobile communicator system 26 also receives sensor data from the communicator itself in step S8, for example, from transducers 70a–70d illustrated in FIG. 2B. Mobile communicator system 26 then compares the previously sampled sensor data to the current sensor data in step S10, and determines whether the change in sensor data has exceeded a predetermined threshold magnitude in step 512.

If the change in sensor data in both steps S6 and S12 have not exceeded their respective threshold magnitudes, mobile communicator system 26 then waits for additional sensor data to be received in step S14. If either of steps S6 or S12 determine that the change in sensor data exceeds the predetermined threshold, mobile communicator system 26 generates a location device warning to the operator in step S16 indicating whether the cargo or mobile communicator system have experienced adverse conditions. In addition, this sensor data is also broadcast to the satellite including the location information of the vehicle in step S18, which data is then received at a dispatch center in step S20. The sensor history and location data are then stored in a central controller in the dispatch center in step S22, and the central controller determines the trouble locations and whether or not the mobile communicator device has experienced adverse conditions in step S24. The trouble locations are then dispatched to the fleet in step S26 as well as suggested corrective measures for the vehicle operator to perform with respect to preventing any future adverse conditions to the cargo or the mobile communicator system in step S28.

FIGS. 4–8 are different views of the mobile communicator system. In FIGS. 4–8, mobile communicator system 26 includes left and right end bumpers 82a, 82b, each with left and right recessed handles 84a, 84b disposed therein on the upper surface of end bumpers 82a, 82b. On the opposite side of end bumpers 82*a*, 82*b* are respectively positioned finger grips 92*a*, 92*b* which further provide traction for gripping mobile communicator system 26. Advantageously, end bumpers 82*a*, 82*b* with recessed handles 84*a*, 84*b* and finger grips 92*a*, 92*b* provide an effective way of protecting mobile communicator device 26 while being handled or gripped by the vehicle operator.

Mobile communicator device 26 further includes keyboard 86 with inclined palm rest 88 and display 90. Keyboard 86 is designed in such a manner to insure that no fluids which might be encountered by mobile communicator system 26 be permitted to pass therethrough. Accordingly, keyboard 86 is comprised of a standard rubber/carbon keyboard which, however, is sealed to the opening around the outer edges of mobile communicator system 26 corresponding to keyboard 86. In this manner, fluids which are spilled onto keyboard 86 will not enter the electrical components of the mobile communicator system 26 Resistive or mechanical switches may be disposed below keyboard 86 for selecting specific characters.

Display 90 also advantageously comprises a shock resistant material, such as tempered glass having a thickness of approximately 0.125 inches. Display 90 is sealed to the housing of mobile communicator system 26 using a seal material such as silicon foam applied to the outer edge of display 90 and the housing using an adhesive. The exterior housing of mobile communicator system 26 is preferably constructed of a shock resistant material, such as a polycarbonite, or G. E. Cycoloy type material. End bumpers 82*a*, 82*b* may comprise a elastomeric or silicon rubber. Accordingly, this extremely durable exterior of mobile communicator system 26 provides additional protection which was discovered to be necessary for such a device when used in a vehicle as described and contemplated.

Mobile communicator device 26 further includes the feature of steering wheel steps or rests, 96*a*, 96*b* which permit the vehicle operator to temporarily mount mobile communicator system 26 on the steering wheel for convenience of use. Further, mobile communicator device 26 includes recessed area 100 and cable outlet access 102 in right end bumper 82*b* for further organizing the various cables which may be connected to mobile communicator device 26, and for organizing the cables which are required to be plugged therein, for example, end cable plugs 108 and 110.

Mobile communicator system 26 also includes the advantageous features of sensors embedded therein to automatically determine mishandling of the mobile communicator system, together with a durable and shock resistant exterior. In addition, mobile communicator system 26 includes the conveniences of being able to temporarily mount the device on the steering wheel of a vehicle, as well as organizing the cables in a manner which minimizes the intrusiveness thereof. Finally, mobile communicator system 26 includes means which facilitates the easy handling of the device by providing hand grips on both sides of the device in the end bumpers.

Mobile communicator system 26 also includes PCMCIA port 106 which is covered by a rubber protective cap in which also includes recessed access portion 94 for opening the rubber cover to gain access to the PCMCIA port.

Figure 9:
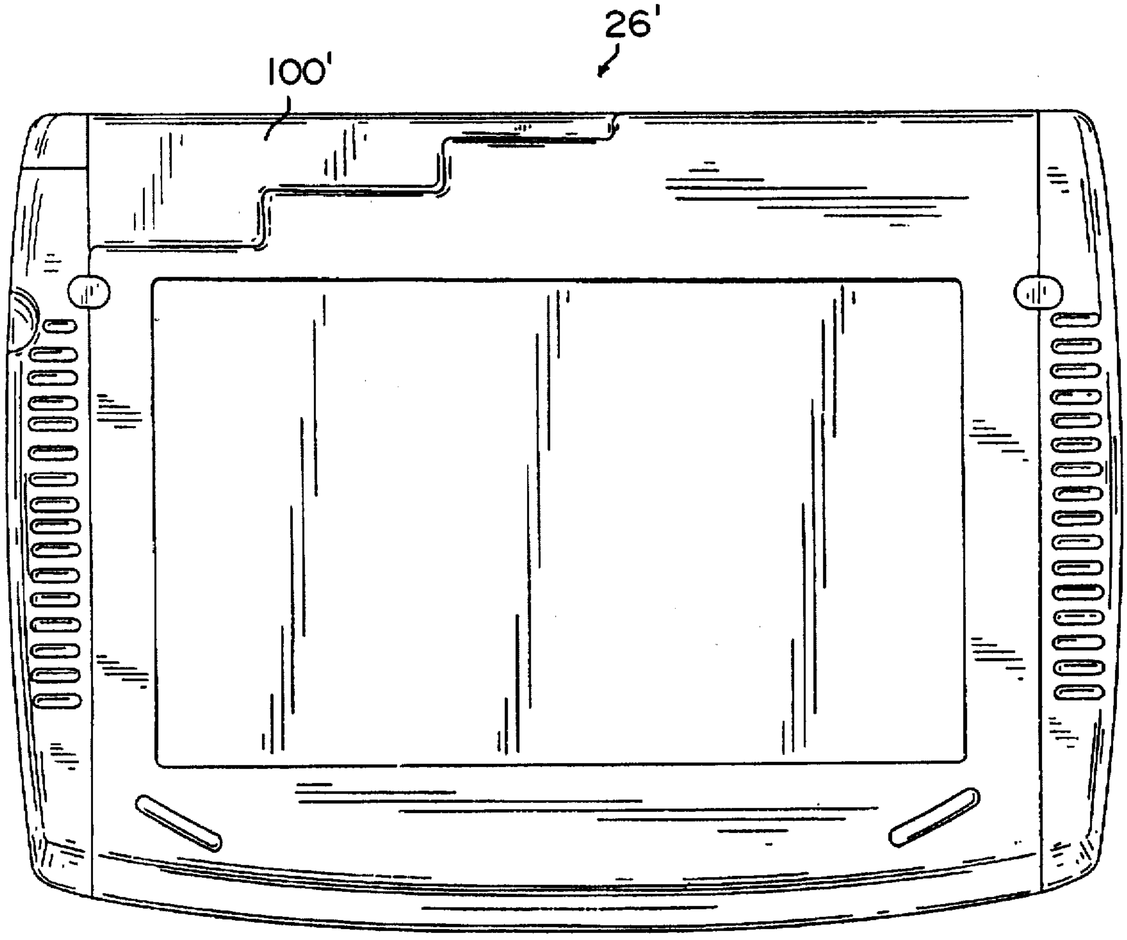
FIGS. 9–10 are respective bottom plan and rear elevational views of another embodiment of the mobile communicator system.
Figure 10:
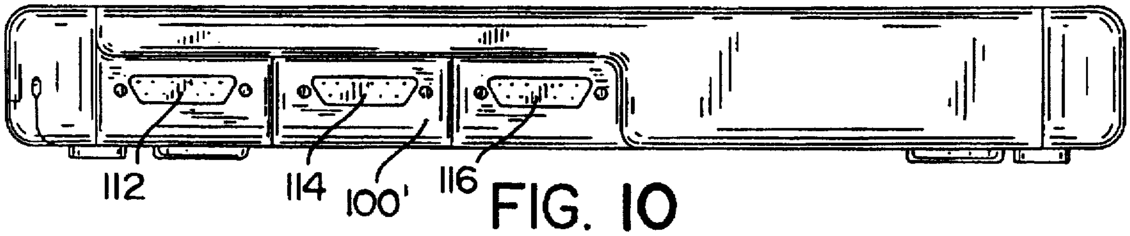

FIGS. 9–10 are respective bottom plan and rear elevational views of another embodiment of the mobile communicator system. The remaining views of mobile communicator device are essentially similar as described in connection with the first embodiment. As shown in FIGS. 9–10, mobile communicator device includes modified recessed area 100' which accommodates multiple input/output ports 112, 114, and 116. Advantageously, recessed area 100' is configured in a step like function or manner so that the corresponding cable ends for each of the cables do not interfere with each other and which permit the cables to be uniformly exited through exit hole 104 of right end bumper 82*b*.

Figures 1, 14:
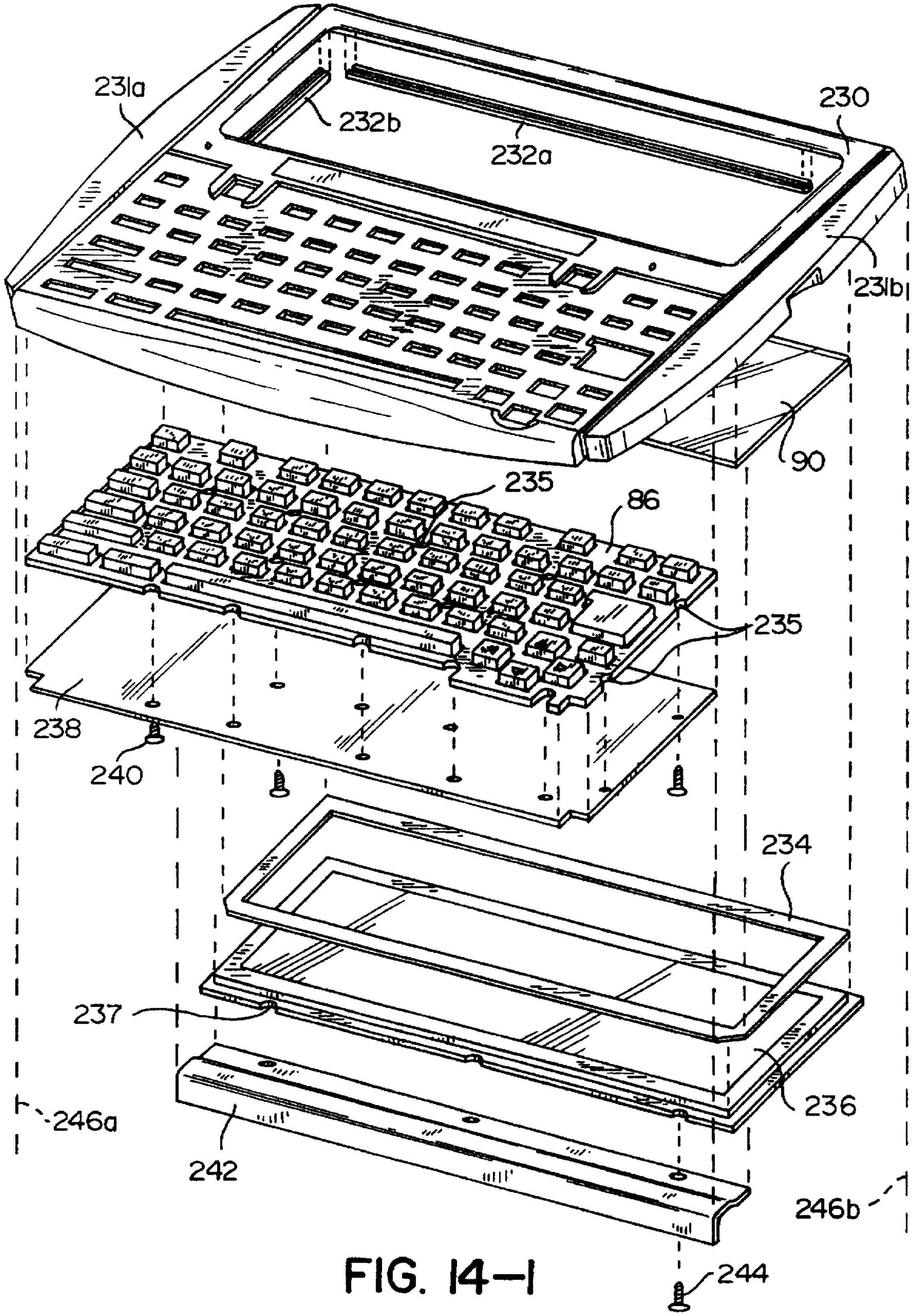
Figures 2, 14:
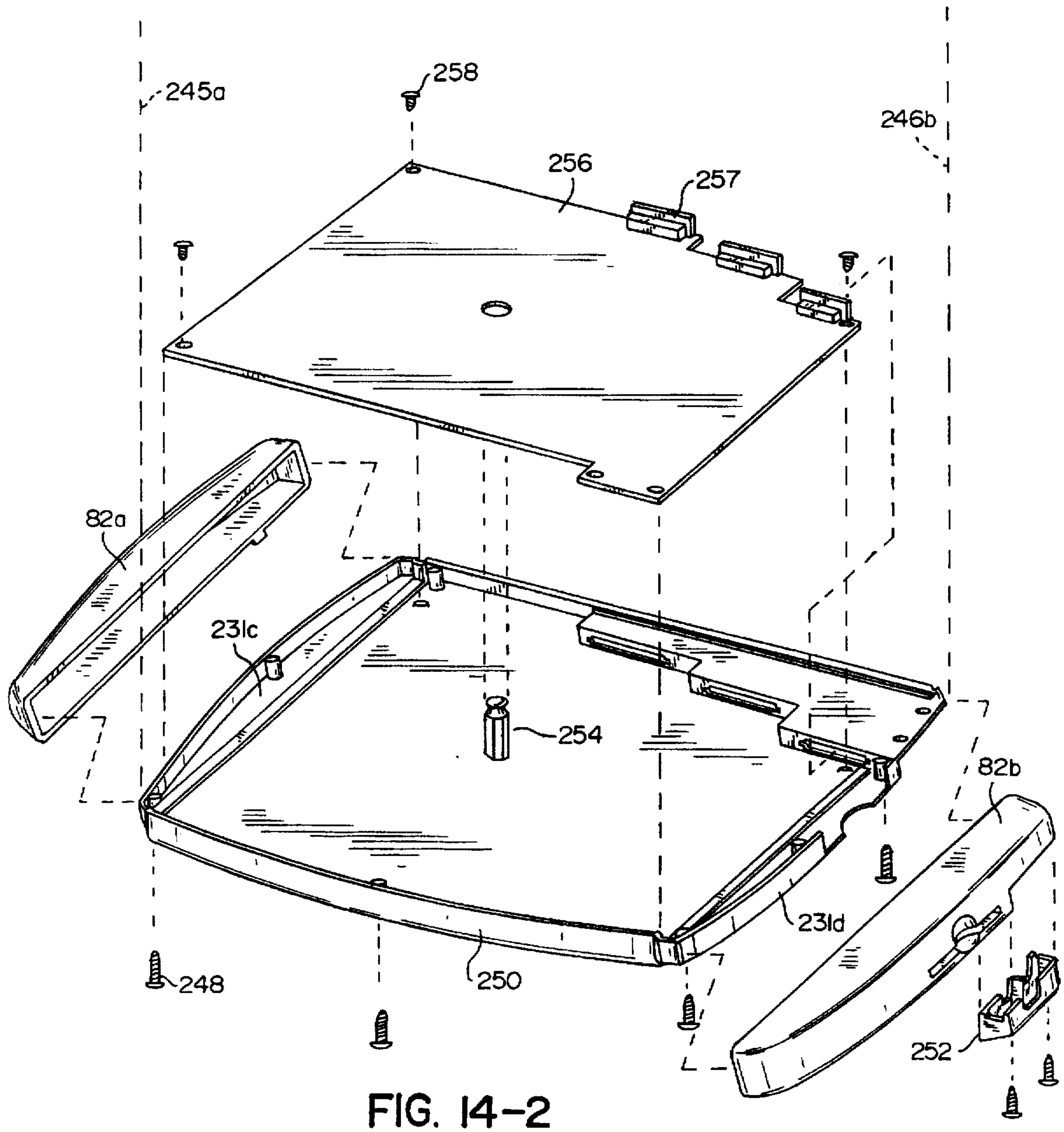

FIGS. 14-1–14-2 are exploded views of the mobile communicator system showing the inner components. FIG. 14-1 illustrates the construction of the upper portion of the mobile communicator system, while FIG. 14-2 illustrates the construction of the lower portion of the mobile communicator system. The upper and lower portions are assembled together as illustrated by dashed lines 246*a* and 246*b* and connection screws 248. Connection screws 248 are attached or mounted to female connectors mounted in the upper portion described in detail below in connection with FIG. 16.

The upper portion in FIG. 14-1 comprises upper casing 230 with upper handle receiving portions 231*a* and 231*b*. Upper handle receiving portions 231*a* and 231*b* are used for mounting end bumpers 82*a*, 82*b* illustrated in FIG. 14-2. End bumpers 231*a* and 231*b* advantageously serve to protect the mobile communicator system from adverse conditions, such as mishandling, falls, etc. Upper casing 230 includes elastomer sections 232*a* and 232*b* and tempered glass 90 for protecting monitor 236 used to display data transmitted and received between the mobile communicator system and a central control system, sensors, etc. Elastomer sections 232*a* and 232*b* are used to absorb shock experienced by the mobile communicator system, thereby protecting tempered glass 90 from being broken, chipped or shattered. Elastomer sections 232*a* and 232*b* are also used as a seal for the monitor portion of the mobile communicator system preventing or inhibiting the entrance of fluid therein. Similarly, tempered glass 90 protects monitor 236 from the external conditions experienced or encountered by the mobile communicator system.

An additional elastomer or foamed material 234 is advantageously disposed or arranged between tempered glass 90 and monitor 236. Foamed material 234 may be adhesively secured to either of the monitor 236 or tempered glass 90. Tempered glass 90 may be either chemically or heat treated tempered glass. However, we have discovered unexpectedly that for the mobile communicator bracing system application, heat treated tempered glass performs much better for he types of external conditions the mobile communicator will experience. An additional foamed material similar in construction to foamed material 234 may also advantageously be disposed between upper casing 230 and tempered glass 90. This additional foamed material provides enhanced protection for the tempered glass 90 and inner components by simultaneously providing additional shock distribution and a water resistant seal between the upper casing 230 and the tempered glass 90. Monitor 236 includes screw holes 237 advantageously shaped in the size of a "half moon." As will be described in detail below, screw holes 237 facilitate the easy removal of monitor 236 while maintaining connection of other components inside the mobile communicator system.

The upper portion of the mobile communicator systems also includes keyboard related components which are mounted to upper casing 230. In particular, keyboard 86 is comprised of a standard rubber/carbon keyboard which, however, is sealed to the opening around the outer edges of the mobile communicator system. In this manner, fluids which are spilled onto keyboard 86 will not enter the electrical components of the mobile communicator system. Thus, keyboard 86 includes mounting holes 235 around its periphery in a "half moon" shape as well as circular holes placed between the various elevated keys. Printed circuit board 238 includes resistive switches positioned below the keys of keyboard 86 for selecting specific characters. Screws 240 are used to mount printed circuit board 238 and keyboard 86 to upper casing 230 in a secure and water resistant or water proof manner as will be described in detail below. Screws 240 enter holes in printed circuit board 238 and mounting holes 235 around the periphery and within keyboard 86.

Mounting bracket 242 is then positioned above monitor 236 and printed circuit board 238 for securely mounting the keyboard and monitor components to upper casing 230 via screws 244. Screws 244 advantageously are not inserted in any circular hole in monitor 236, but rather are inserted in "half moon" shaped hole 237 of monitor 236, permitting easy removal and insertion of monitor 236 from upper casing 230. Thus, the pressure exerted from screws 244 on mounting bracket 242 and monitor 236 thereby holds or retains monitor 236 to upper casing 230.

The bottom portion of the mobile communicator system in FIG. 14-2 includes lower casing 250 with lower handle receiving portions 231*c* and 231*d* which cooperate with upper handle receiving portions 231*a* and 231*b* for mounting end bumpers 82*a* and 82*b* to the upper and lower casings 230 and 250. End bumper 82*b* is advantageously configured to include a recessed portion which receives cable securing member 252 mounted thereto.

Cable securing member 252 is used to affix or secure cables which are connected between input/output ports 257 of the mobile communicator system to external devices or destinations. Input/output ports 257 are connected to printed circuit board 256 which advantageously comprises the overall microprocessor circuitry for performing the processes of the mobile communicator system. Printed circuit board 256 is advantageously mounted to lower casing 250 via screws 258, and includes a center hole for receiving therethrough support 254. Support 254 is mounted to lower casing 250 and is used to maintain clearance between upper and lower casings 230 and 250 as well as prevent buckling of the upper and lower casings 230 and 250 together. Thus, support 254 is an important structural feature of the lower casing 250.

Advantageously and significantly, support 254 includes at its upper surface a rubber or shock absorbing element that reduces or distributes the shock experienced by the mobile communicator and on its inner components. Thus, this additional shock absorbing element is also a feature of the structure of the mobile communicator bracing system.

FIGS. 14-1 and 14-2 therefore illustrates the modular construction of the mobile communicator system which permits the various components relating to the keyboard, monitor and microprocessor related elements to be securely mounted to the upper and lower casings 230 and 250. Accordingly, the components within the mobile communicator system are protected from external shock and external conditions, including the feature of being water resistant.

Figure 15:
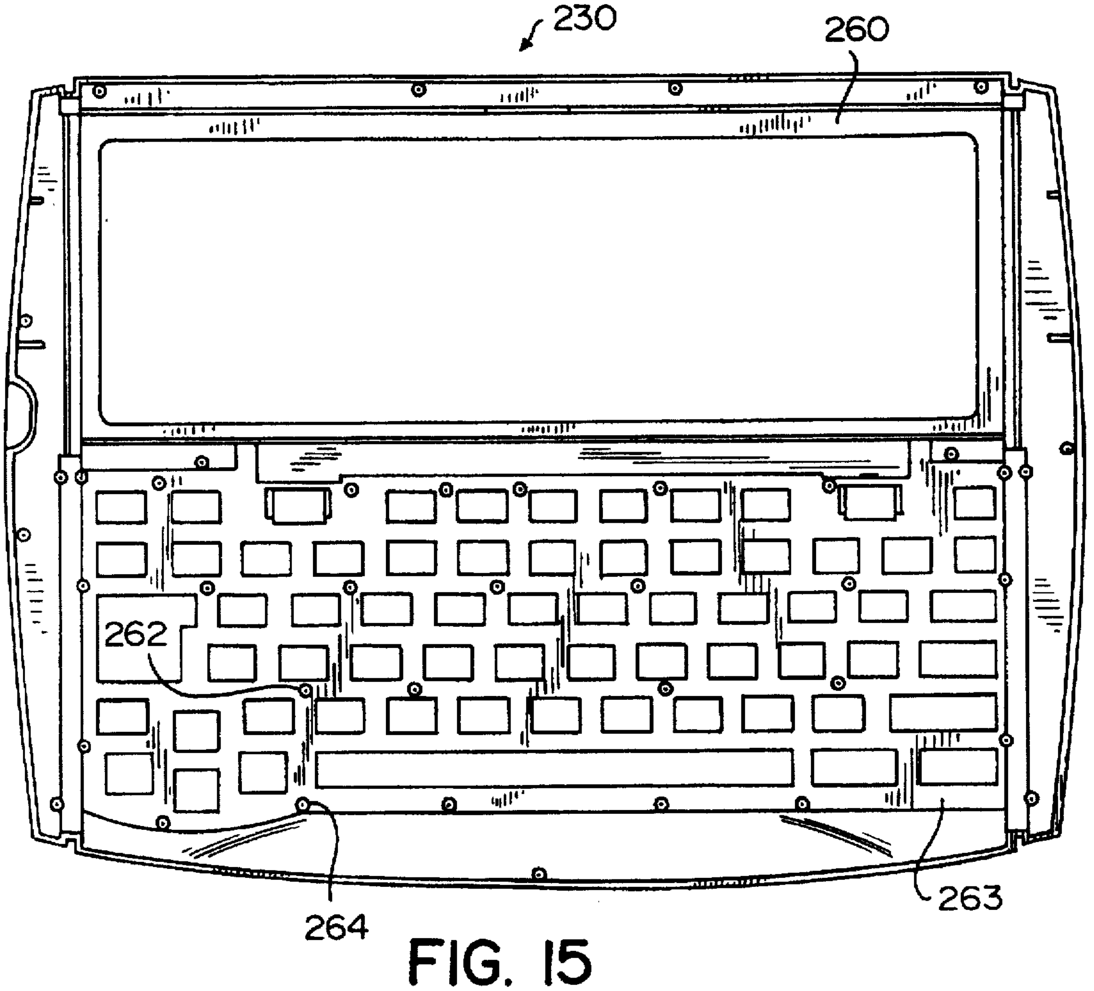
FIG. 15 is a top plan view of the upper casing in the mobile communicator system viewed from the inside.

FIG. 15 is a top plan view of the upper casing in the mobile communicator system viewed from the inside. No internal components of the mobile communicator system have been mounted to upper casing 230. As illustrated in FIG. 15, upper casing 230 includes protruding or elevated rod or stick-like portions 260 which extend around the monitor opening of upper casing 230. Elastomer sections 232*a* and 232*b* (shown in FIG. 14-1) are placed on elevated portions 260 and used as a seal for the monitor portion of the mobile communicator system, preventing or inhibiting the entrance of fluid therein. Keyboard template 263 includes female mounting connectors 262 and 264 which extend above the surface and which enter or penetrate through keyboard holes 235 in keyboard 86 (keyboard holes 235 and keyboard 86 are illustrated in FIG. 14-1).

Figure 16:
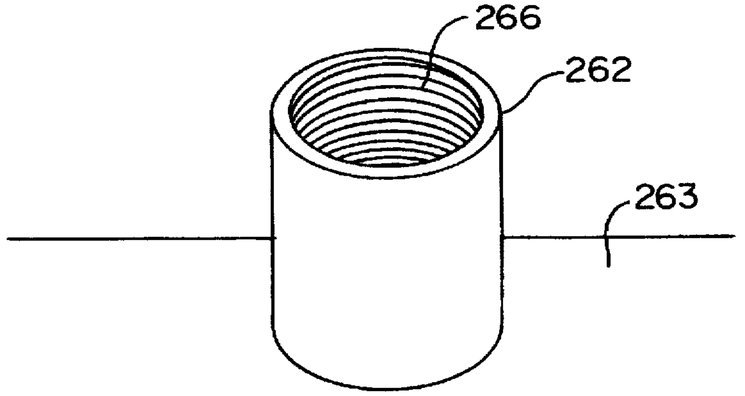
FIG. 16 is an enlarged view of a female connector in the upper casing of the mobile communicator system of FIG. 15.

FIG. 16 is an enlarged view of a female connector in the upper casing of the mobile communicator system of FIG. 15. As illustrated in FIG. 16, female connector 262 (or connector 264 in FIG. 15) is elevated and extends above keyboard template surface 263. Female connector 262 includes threaded portions 266 formed therein for receiving screws 240 (illustrated in FIG. 14-1) to mount the keyboard to the upper casing. Female connectors advantageously extend above surface 263 to enhance the water resistivity of the mobile communicator system and to firmly secure the keyboard to the upper casing. Thus, the keyboard is not only tightly secured around its outer edges to the upper casing, but also in various locations interior or more centrally located in the keyboard.

Figure 17:
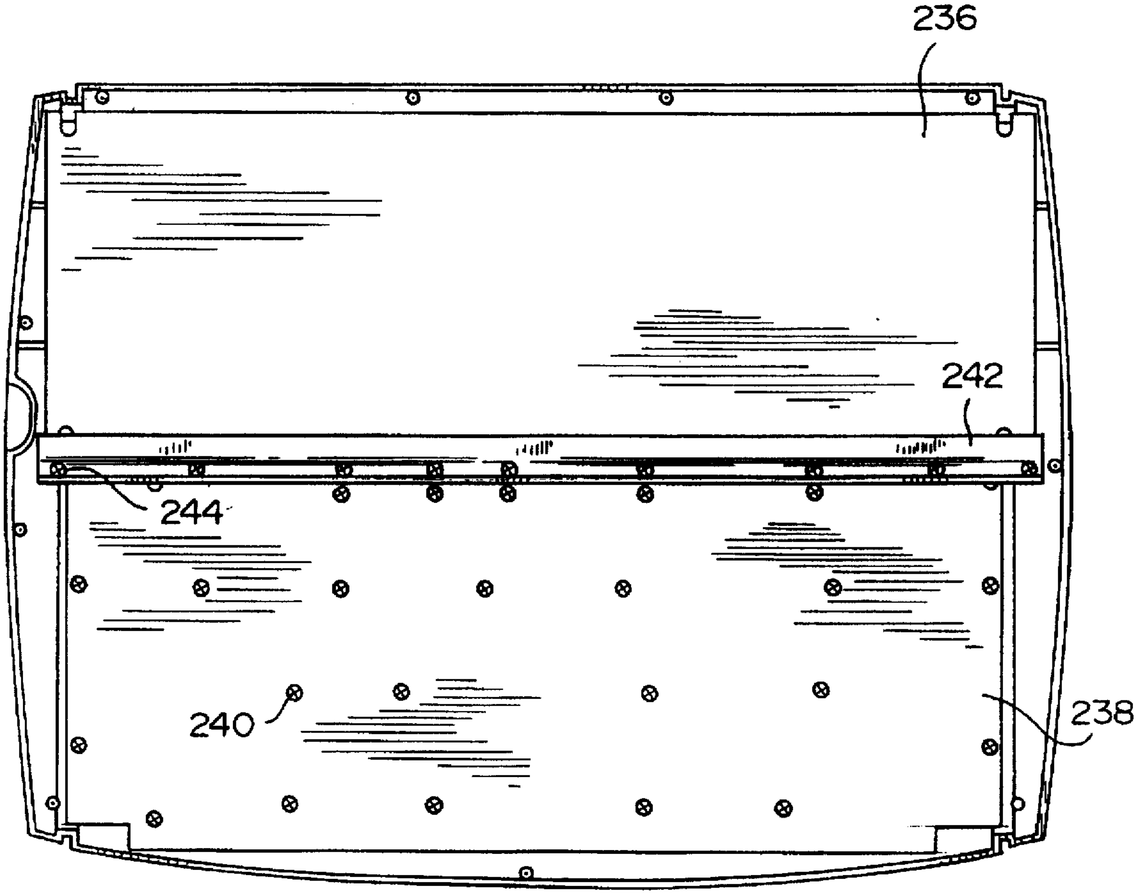
FIG. 17 is a top plan view of the mobile communicator system viewed from the inside when assembled.

FIG. 17 is a top plan view of the mobile communicator system viewed from the inside when assembled. As shown in FIG. 17, monitor 236 is secured by the pressure of mounting bracket being fixed to the upper casing via screws 244. Printed circuit board 238 (used in connection with the keyboard) is also mounted to the upper casing via screws 240.

Figure 18:
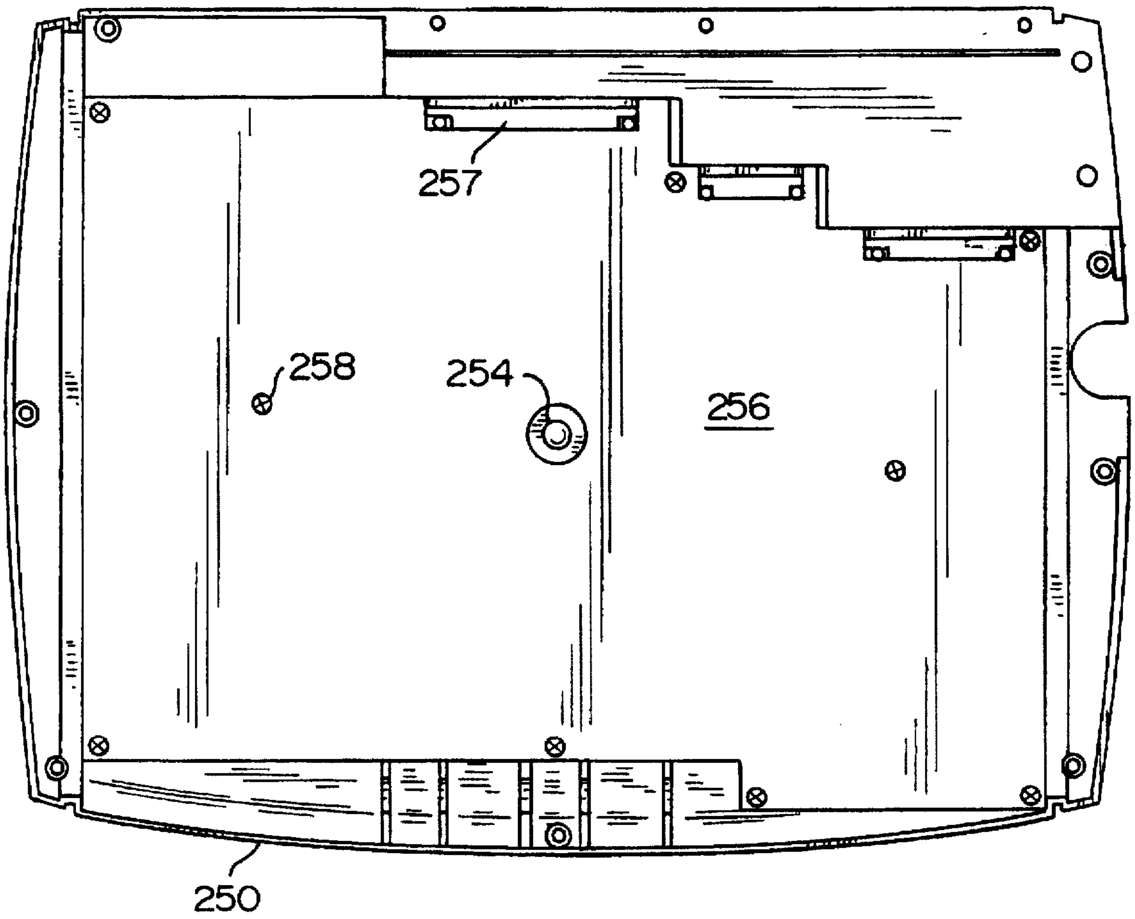
FIG. 18 is a bottom plan view of the mobile communicator system viewed from the inside when assembled.

FIG. 18 is a bottom plan view of the mobile communicator system viewed from the inside when assembled. As illustrated in FIG. 18, printed circuit board 256 is secured via screws 258 to the lower casing 250. Input/output ports 257 are positioned to cooperate with external holes (not shown) in the lower casing 250 for connection to external devices or destinations. Support 254 protrudes through a hole in printed circuit board 256, and prevents the lower and upper casings from buckling inward.

Advantageously, the present invention also provides the capability to identify and notify an appropriate party. An appropriate party can be, for example, a party that may assume responsibility for any damage to a vehicle or cargo contained therein on a predesignated geographic location, or a party interested in monitoring their own vehicles that are in transit on transport routes of others. The geographic location may be determined based on a particular transport route, based on a specific geographic area, and the like. In accordance with this structure, a central controller that is unbiased with respect to the various parties participating herein is able to determine the party that is responsible for conditions occurring thereon.

Accordingly, the central controller identifies, not only knowledge of where the condition has occurred, but also identifies a responsible or appropriate party to be notified of the condition. For example, an appropriate party to receive notification of the occurrence of the condition may be as the owner of the geographic location, owner of the facilities in a specific geographic location (e.g., owner of railroad track, private road, parking lot, etc.), and the like.

This routing and dispatching system determines on a real-time basis the appropriate party to be notified of a condition, for example, a carrier that was handling the railroad car or truck at the time of an alarm message, and to dispatch the message to that party/carrier. A standard geographic server or global positioning system provides longitude and latitude coordinates of the vehicle and the conditions to assist in the determination of the appropriate party. The global positioning system determines the vehicle's location within seconds after an event or condition triggers a message that is transmitted to the central controller. The global positioning system provides functions that interface or cooperate with other geographic information to identify the appropriate party to be contacted, such as notifying a railroad carrier when the railroad carriers' tracks are in close geographic proximity to the reported location of the event or condition.

We have discovered, however, that there are several instances of data ambiguity, inaccuracy, incompleteness and/or uncertainty. Thus, additional information, besides information collected by the sensing station, may also be needed to assist in the identification of the responsible and/or appropriate party. For example, because of jointly switched facilities, trackage rights, map inaccuracies, and other factors, this type of geographic analysis cannot by itself provide a fail safe method for determining which railroad was handling the car at the time of an alarm. Further, we have also discovered that, at times, the accuracy of the GPS system can be off by as much as 300 feet, and it may be difficult to locate rail cars in heavy traffic areas, such as yards and corridors with multiple tracks. This can result in difficulty identifying the appropriate party, such as an operating railroad. However, a set of decision rules that intelligently combines this information with information available from other sources, such as waybill data, provides better results than those obtainable using a single source, especially within the required time frame. Such additional information, as discussed below in detail, can be provided by the TRAIN II® database administered by the Association of American Railroads (AAR), as well as the standard UMLER®, Federal Railroad Administration files, U.S. Census Tiger files, and SCO 90 Mileage databases.

For example, a mobile sensing station or sensor aboard a vehicle detects an impact at 08:00:00, obtains a GPS position fix at 08:00:13, and transmits a message describing the detected condition. The message is received at 08:01:36 by the central controller. The latitude and longitude in the message are passed to the geographic server, which identifies the vehicles on route 1 administered by a first party. The waybill, however, retrieved by the central controller via a secondary database such as the TRAIN II database shows that the vehicle is on route 2 administered by a second party.

Thus, the data sources provided to the central controller are in conflict. Advantageously, however, the routing and dispatching system includes decision rules that choose, if geographic analysis suggests, for example, several possible roads, those roads that are in the route over those that are not. Another example rule relates to reporting delays. Since reporting delays may affect the timeliness of certain data, for example, the TRAIN II data, an expedient rule we have added, for example, states if the geographic server does not return the road suggested by TRAIN II data but does return a road that appears later in the route, choose the latter road that appears later in the route.

Examples of data that may be collected from the mobile sensing station and/or a secondary data source such as the TRAIN II are:

1. Vehicle ID
2. Current vehicle location
3. Date/Time of event
4. Geographic area/road vehicle reporting on
5. Vehicle's last reported location
6. Vehicle's origin and intended destination
7. Type of cargo carried by vehicle (perishable, breakable, edible, boxed, vacuum packed, etc.
8. Last carrier/party reporting vehicle's most recent status
9. Identification of most recent vehicle change from first party to second party including identification of parties, location, etc.
10. Handling Railroad (at time of condition)
11. Car status at last location (empty/full)
12. Type of event
    a) Alarm message
    b) Status message
    c) Low battery condition message
    d) System restart message
    e) Transmission error
    f) Reception error
    f) Excessive alarm error
13. X/Y/Z axis acceleration values Under the above described methodology, various combinations of the above collected information from single or multiple sources are used, preferably in accordance with predefined rules, to determine the appropriate party to be contacted with respect to the occurrence of a vehicle or cargo related condition.

In the railroad context, examples of information requested from the routing and dispatching system may include:

Railroad

Given a latitude and a longitude, returns a list of the railroad or railroads whose tracks are in closest proximity to the given geographic point where the condition has occurred. In most cases, a single railroad is returned; however, if two or more railroads are close to the point and nearly equidistant from it, all railroads will be returned. If no railroad runs within one mile of the point, a no railroad indicator is returned.

Freight Station

Given a latitude and a longitude, a description of the location of the given geographic point where the condition occurs relative to the nearest rail freight station or stations is provided. The description preferably includes distance, direction of location (e.g., city, state, railroad), and the like. If two or more stations are nearly equidistant from the point, all will be returned.

Figure 19A:
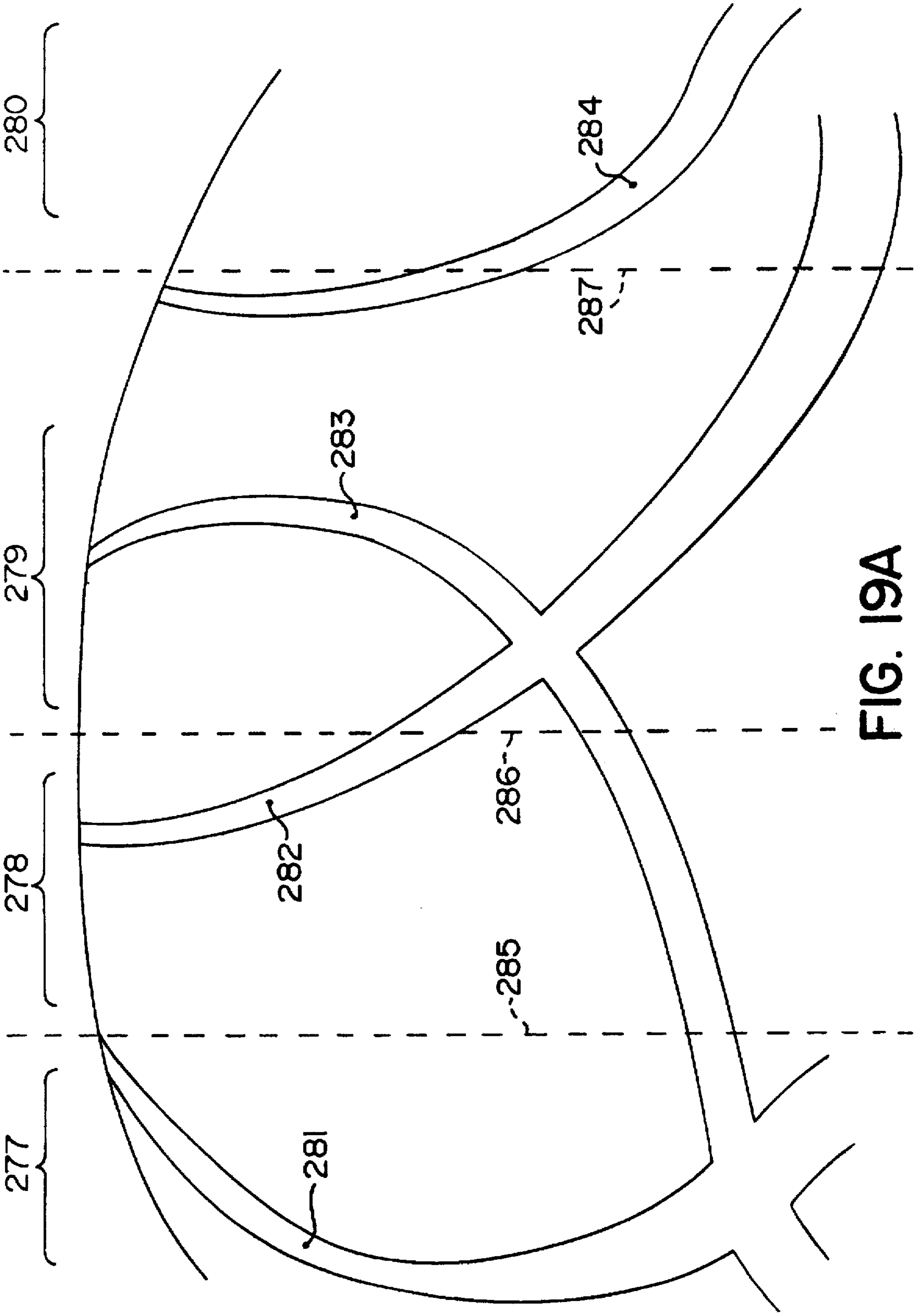
FIG. 19A is an illustration of a first method of determining a responsible party for conditions occurring along a transport route.

FIG. 19A is an illustration of a first method of determining a responsible party for, or appropriate party to be notified of, conditions occurring along a transport route. In FIG. 19A, separate geographic areas are designated at 277, 278, 279 and 280 representing separate areas for which different parties are responsible for conditions. The separate geographic areas are generally predesignated before the central controller determines the responsible party. However, the separate geographic areas may be altered as well, either statically or dynamically while the vehicles are in transport. Vehicles 281, 282, 283 and 284 are located in separate geographic areas 277, 278, 279 and 280, respectively. Separate geographic areas 277, 278, 279 and 280 are bounded by vertical dotted lines 285, 286 and 287. Other configurations for bounding the different geographic areas are, of course, also possible. According to this structure, the central controller stores data bounding the separate geographic areas 277, 278, 279 and 280. When the central controller receives a signal from the satellite indicating the occurrence of a condition, the central controller maps this condition to a specific geographic area to determine the responsible party or appropriate party to be notified of the condition. The central controller then notifies the party associated with the geographic area where the condition occurs. The central controller may also notify the party associated with the vehicle as well based on vehicle identification, if the party associated with the vehicle is different than the party associated with the geographic area. This is discussed in detail below.

Figure 19B:
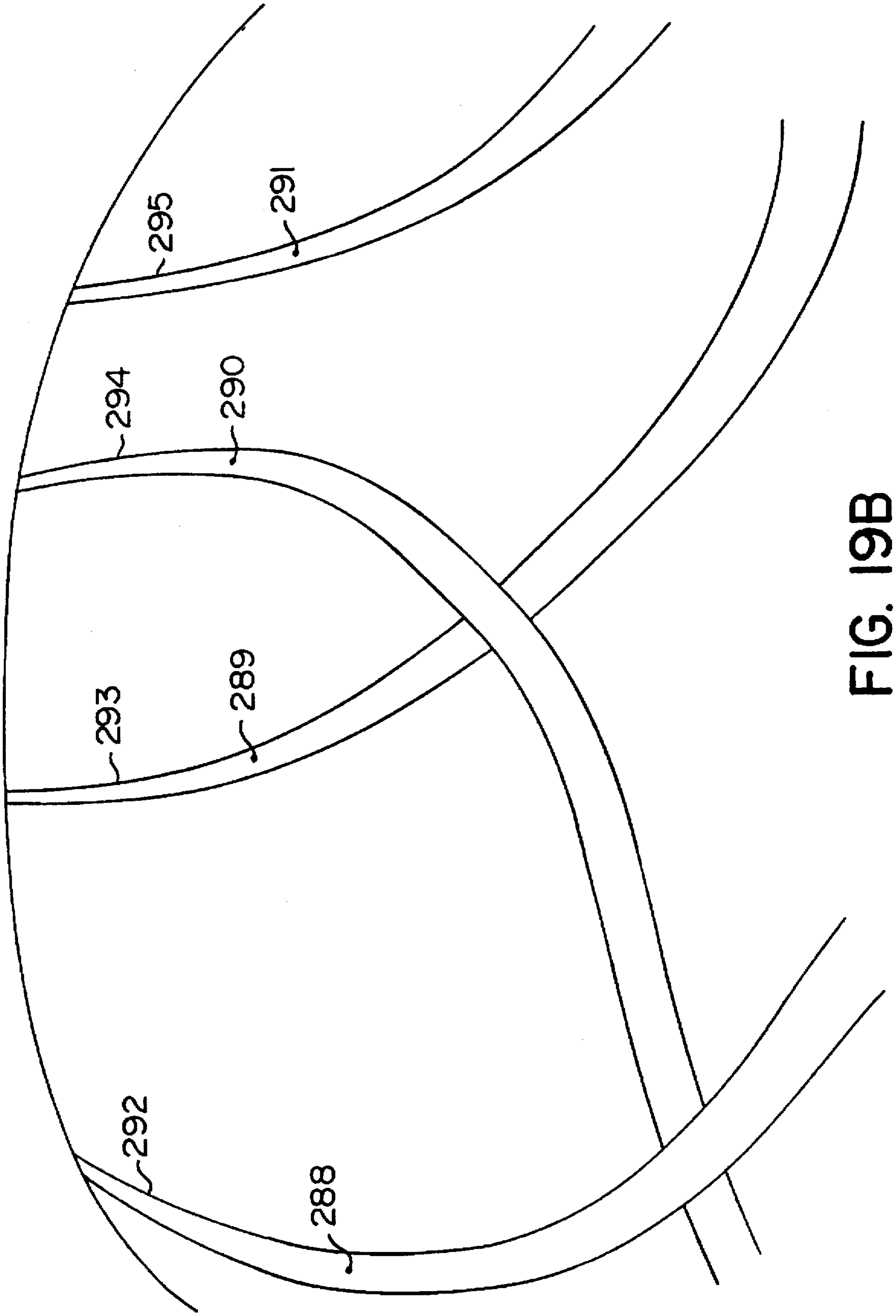
FIG. 19B is an illustration of a second method of determining a responsible party for conditions occurring along a transport route.

FIG. 19B is an illustration of a second method of determining a responsible party for, or appropriate party to be notified of, conditions occurring along a transport route. In FIG. 19B, separate transport routes are designated at 292, 293, 294 and 295 representing separate routes for which different parties are responsible for conditions. The separate routes are generally predesignated before the central controller determines the responsible party. However, the separate routes may be altered as well, either statically or dynamically while the vehicles are in transport. Vehicles 288, 289, 290 and 291 are located in separate routes 292, 293, 294 and 295, respectively. In this arrangement, separate routes 292, 293, 294 and 295 are not generally bounded. Other configurations for designating separate routes are, of course, also possible. Furthermore, other methods of correlating or corresponding the occurrence of conditions to a specific party are also possible. For example, responsible or appropriate parties can be determined by the type of condition. Thus, an engine company can be the responsible party for the occurrence of an engine condition (e.g., low oil, overheating, etc.), a cargo company can be the responsible party for a cargo related condition (e.g., cargo damage), a truck company can be the responsible party for a truck condition (e.g., speeding). According to this structure, the central controller stores data identifying the separate transport routes 292, 293, 294 and 295. When the central controller receives a signal from the satellite indicating the occurrence of a condition, the central controller maps this condition to a specific transport route to determine the responsible/appropriate party. The central controller then notifies the appropriate party associated with the transport route, such as the owner of the railroad track or governmental authority. The central controller may also notify the party associated with the vehicle as well based on vehicle identification, if the party associated with the vehicle is different than the party associated with the transport route.

Figure 20:
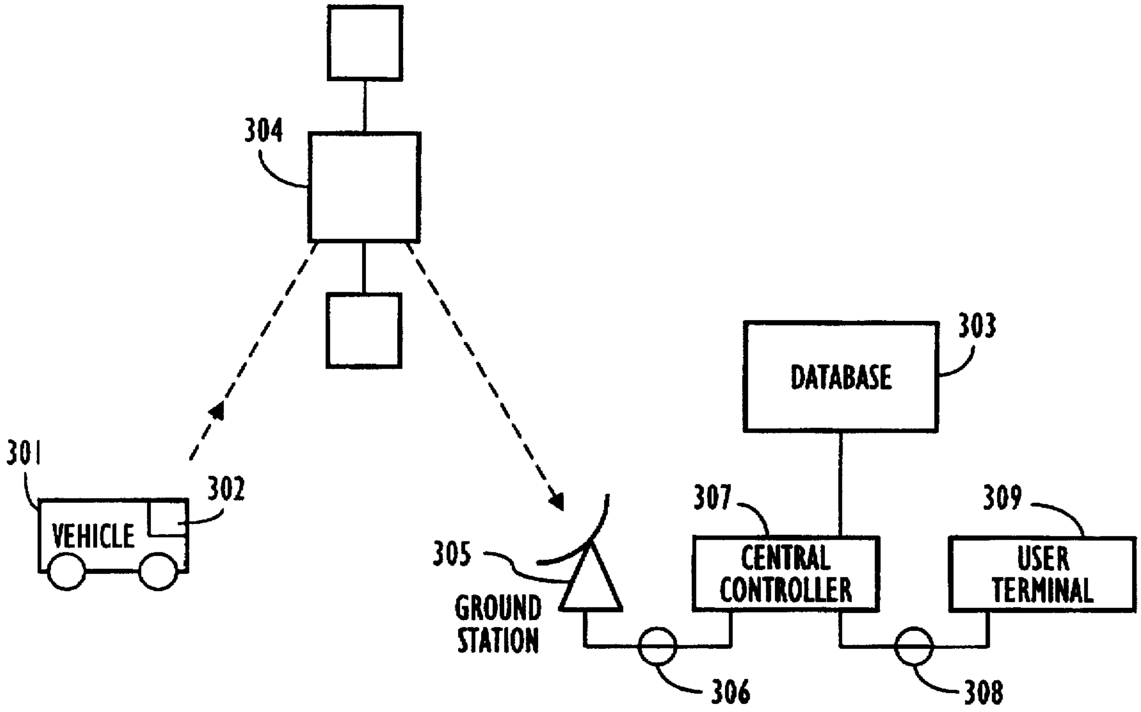
FIG. 20 illustrates the general layout of a system for determining a responsible party associated with the occurrence of a condition.

FIG. 20 illustrates the general layout of a system for determining a responsible party for, or appropriate party to be notified of, the occurrence of a condition. In FIG. 20, a vehicle 301, usually transporting cargo, moves along a transport route. The route can be one that is well known, or it can be one that is being newly travelled by the vehicle. The vehicle carries at least one mobile sensing station 302, which functions to detect events or conditions (such as collisions or impacts, potholes or uneven tracks or the like) along the travel route, and transmit data regarding those conditions via orbiting satellite 304 to a remote ground station 305. The ground station transfers the data from the mobile sensing station to the central controller 305 through data link 306. A user terminal 309 can access data in the central controller via communications link 308. Central controller 307 has access to data base 303 that stores suitable data for determining a responsible or appropriate party associated with the occurrence of a condition. As indicated above, data base 303 may include data identifying the responsible party by transport route, by geographic location, by type of condition, by any combination of the above, as well as for other criteria.

In general, the central controller receives the various condition data and assigns a responsible party for, or appropriate party to be notified of, the condition responsive thereto. If the various condition data represent conflicting responsible or appropriate parties, the central controller determines a ranking for the parties. One method of ranking the responsible party may be the time or order at which the condition occurred. For example, if a cargo related condition occurs first and then an engine related condition, the responsible party may be determined, for example, by assigning the party associated with a cargo condition as the responsible party.

Alternatively, conditions that are related to each other, or the combination of conditions together may indicate a responsible party. For example, a speeding condition might be detected while at the same time a braking condition is detected. In this instance, the speeding condition might be the result of the failure of the brakes, and therefore, the responsible party assigned by the central controller would be the braking company and not the trucking company. In accordance with the above, data base 303 stores information relating to the conditions, and central controller 307 determines the responsible party as described above.

Figure 21:
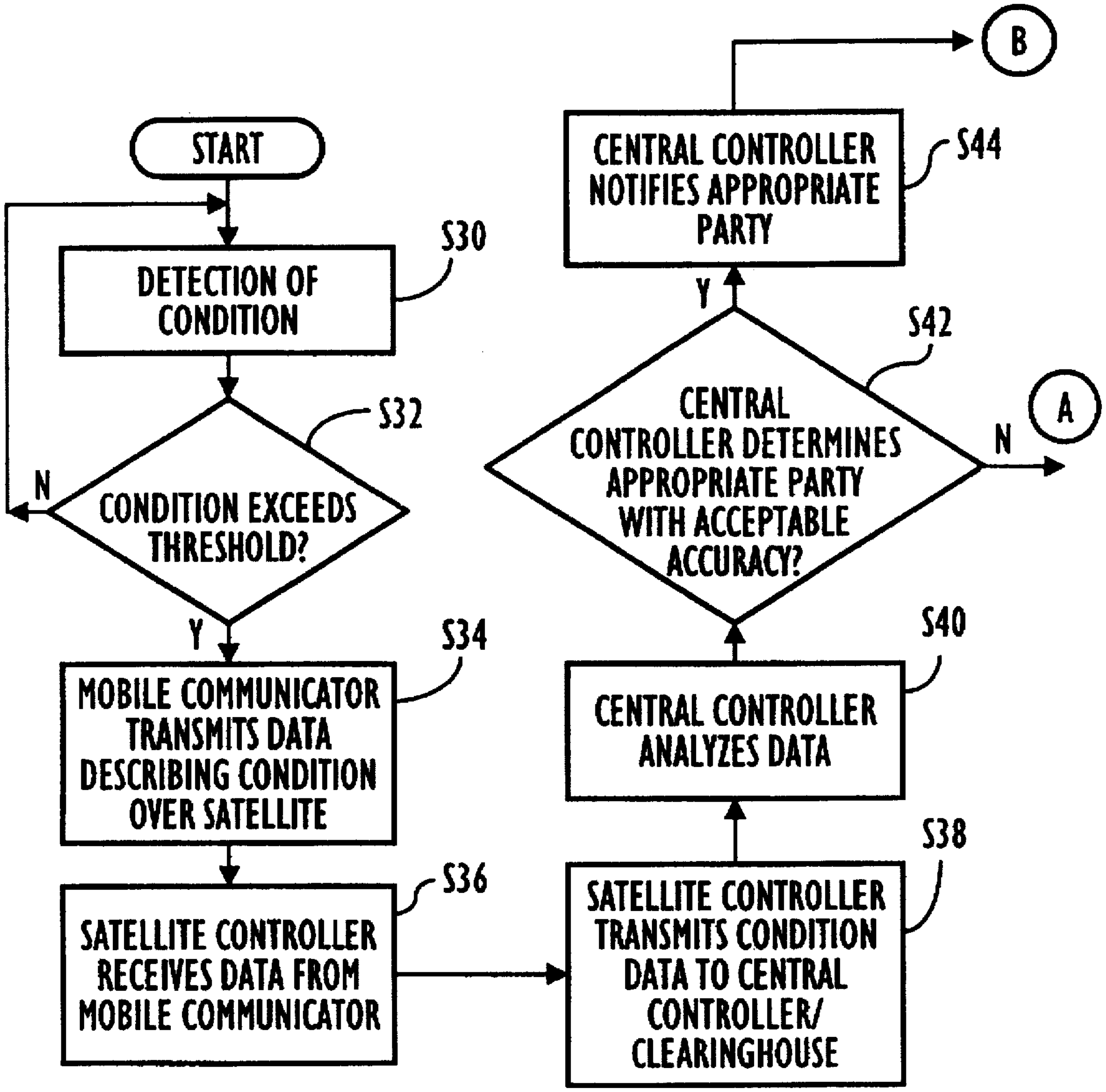
FIGS. 21–22 are flowcharts of the computer implemented process for determining the responsible and/or appropriate party to be notified of the occurrence of a condition(s).
Figure 22:
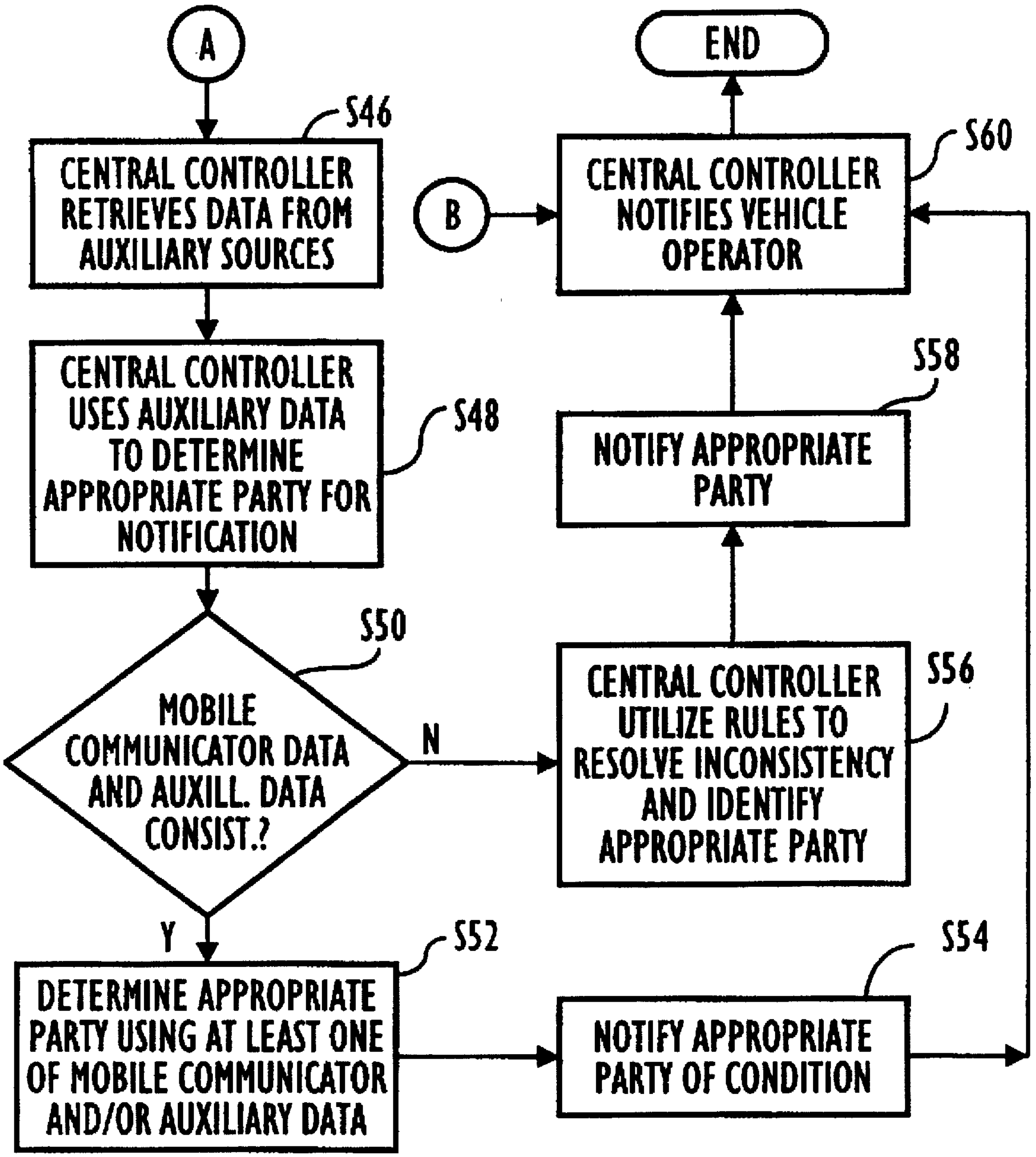

FIGS. 21–22 are flowcharts of the computer implemented process for determining the responsible and/or appropriate party to be notified of the occurrence of a condition(s). In FIGS. 21–22, a condition is detected by the mobile sensing station at step S30. Next, the mobile sensing station or mobile communicator itself determines whether the condition has exceeded a threshold, thereby indicating that the central controller/clearinghouse it to be notified of the occurrence of the condition in step S32. If the condition exceeds the threshold then control is directed to step S34 for additional processing, and if not, control is returned to the monitoring of the occurrence of conditions.

In step S34, the mobile communicator transmits data describing the condition to a satellite for real-time notification to the central controller. The satellite receives the data from the mobile communicator in step S36, and transmits same to the central controller/clearinghouse in step S38. The central controller then analyzes the data in step S40, and determines whether the appropriate party to be notified can be discerned in step S42 with a predetermined level of accuracy (as discussed above).

When the central controller can determine the appropriate party to be notified in step S42, the central controller then generates, in step S44, a message to be transmitted to the appropriate party (described above) informing same of the condition. When the central controller cannot identify the appropriate party with the required accuracy in step S42 using the data received from the vehicle itself, the central controller retrieves additional auxiliary data from external data sources to further assist in the determination of the appropriate party to be notified in step S46 (discussed above).

The central controller then uses the auxiliary data alone or in combination with the previously received data from the mobile communicator to determine the appropriate party in step S48, and optionally determines whether the data received from the mobile communicator and the auxiliary data are consistent in step S50. If the two types of data are consistent as determined in step S50, the central controller next determines the appropriate party using at least one of the mobile communicator and the auxiliary data in step S52, and notifies the appropriate party of the condition in step S54.

When the auxiliary data and the mobile communicator data are not sufficiently consistent as determined by the central controller in step S50, the central controller utilizes rules to resolve the inconsistency and identify the appropriate party (as discussed above) in step S56. The central controller then notifies the appropriate party in step S58.

Finally, the central controller also optionally informs the vehicle operator of the conditions detected regarding the vehicle or cargo stored therein received from the vehicle or other vehicles on the transport route in step S60. For example, the vehicle operator can be instructed where to stop to inspect the cargo or vehicle responsive to the detection of the condition. The vehicle operator may be instructed to stop at the appropriate party that has been notified of the condition, including a party responsible for the occurrence of the condition to verify or determine whether any actual damage resulted to the vehicle or cargo stored therein.

Although a number of arrangements of the invention have been mentioned by way of example, it is not intended that the invention be limited thereto. Accordingly, the invention should be considered to include any and all configuration, modifications, variations, combinations or equivalent arrangements falling within the scope of the following claims.

What is claimed is:

1. In a mobile satellite system including a satellite communication switching office having a satellite antenna for receiving/transmitting a satellite message via a satellite from/to a vehicle using a mobile communication system, a satellite interface system, a fleet management system including a central controller receiving/transmitting the satellite message from/to the satellite communication switching office, the central controller performs at least one of mapping occurrences of conditions along a transport route responsive to the satellite message received from the vehicle via the satellite and the satellite interface system using a mobile sensing station mounted on the vehicle traversing the transport route, and receiving data in the satellite message received from the vehicle, the mobile communication system including a housing comprised of a shock resistant material, the housing including end bumpers comprised of an elastomeric material for absorbing shock experienced by the housing, an input device for inputting data, the input device comprising a keyboard including a rubber/carbon membrane and mounted in the housing using a first seal to prevent fluid from entering the mobile communication system between the input device and the housing, a central processing unit, disposed in the housing, and receiving at least one of the data from the input device, and sensor data received from the mobile sensing station, the sensor data including predetermined condition data occurring along the transport route, positional data, time and date data corresponding to each occurrence of the predetermined condition data, and outputting satellite data to the satellite interface system for transmission to the satellite, and a display monitor comprised of tempered glass having the ability to withstand a predetermined impact, the display monitor mounted in the housing using a second seal to prevent fluid from entering the mobile communication system between the display monitor and the housing, a method comprising the steps of:

(a) detecting for occurrences of the conditions to the vehicle along the transport route, at least one of the conditions indicating that the vehicle is influenced by said at least one of the conditions;

(b) storing data regarding the occurrences of the conditions as well as time and date data corresponding to the occurrences of the conditions;

(c) receiving positional data;

(d) correlating the positional data with data corresponding to the occurrences of the conditions producing correlated data;

(e) triggering the mobile sensing station;

(f) transmitting the correlated data over the communications system to the central controller in response to said triggering step;

(g) determining, responsive to the correlated data, a position on the transport route at which the occurrences of the conditions are detected;

(h) determining, responsive to at least one of the position and the transport route, an relevant party to be notified of the condition; and (i) transmitting to the relevant party a message notifying the relevant party of the occurrence of the condition.

2. The method of claim 1, wherein said step of detecting comprises determining acceleration of the vehicle along at least one axis.

3. The method of claim 2, wherein the acceleration is determined along three orthogonal axes.

4. The method of claim 1, further comprising the step of displaying the correlated data so as to identify positions on the transport route at which the occurrences of the conditions are detected to the vehicles travelling along the transport route, enabling the vehicles that travel along the transport route to be advised of the conditions.

5. The method of claim 1, wherein said step of transmitting (f) comprises:

sending the correlated data to an orbiting satellite;

relaying the correlated data from the orbiting satellite to an earth station; and sending the correlated data from the earth station to the central controller.

6. The method of claim 1, wherein said step of triggering occurs in response to a detected occurrence of the conditions along the transport route.

7. The method of claim 1, wherein said step of triggering occurs in response to the detection of a plurality of occurrences of the conditions along the transport route.

8. The method of claim 1, wherein said step of triggering occurs periodically and is initiated at the mobile sensing station.

9. The method of claim 1, wherein said step of triggering occurs in response to a signal initiated at the central controller.

10. The method of claim 1, wherein said step of transmitting (f) further comprises the steps of:

sending the correlated data from the central controller via a second communications system to a user terminal.

11. The method of claim 1, wherein said step of transmitting (f) comprises the steps of sending the correlated data to a base station of a cellular telephone system; and sending the correlated data from the base station to the central controller.

12. The method of claim 1, wherein the central controller is unaffiliated with the party.

13. The method of claim 1, wherein the central controller receives the correlated data indicating multiple occurrences of the conditions.

14. The method of claim 13, wherein the central controller determines the relevant party responsive to a combination of the multiple occurrences of the conditions.

15. The method of claim 13, wherein the central controller determines the relevant party in accordance with the occurrence of the condition that is first detected when the multiple occurrences of the conditions is present.

16. The method of claim 1, further comprising the step of performing corrective measures to minimize the impact of the conditions and to minimize the adverse impact to the vehicle responsive to the correlated data identifying positions on the transport route at which the occurrences of the conditions are detected.

17. A method of mapping occurrences of predetermined conditions along a transport route travelled by a vehicle storing cargo and equipped with a mobile sensing station connected to a central controller via a communications system, comprising the steps of:

(a) continuously detecting for occurrences of the conditions to the vehicle along the transport route, at least one of the conditions indicating that the vehicle is influenced by said at least one of the conditions;

(b) receiving positional data and correlating the positional data with data corresponding to the occurrences of the conditions to produce correlated data, and transmitting the correlated data to a central controller;

(c) determining, responsive to the correlated data, a position on the transport route at which the occurrences of the conditions are detected;

(d) determining, responsive to at least one of the position and the transport route, a relevant party to be notified of the condition; and (e) transmitting to the relevant party a message indicating occurrence of the condition.

18. The method of claim 17, further comprising the step of transmitting to the relevant party an accountability report in the message requiring resolution.

19. The method of claim 17, further comprising the step of retrieving secondary data from secondary data sources to assist in the identification of the relevant party to be notified in said determining step (d).

20. The method of claim 19, wherein when said determining step (d) indicates a relevant party that is inconsistent with the secondary data, said method further comprises the step of determining the relevant party in accordance with predetermined rules used to resolve the inconsistency.

21. The method of claim 19, wherein the secondary data includes at least one of:

1) Vehicle ID
2) Current vehicle location
3) Date/Time of event
4) Geographic area/road vehicle reporting on
5) Vehicle's last reported location
6) Vehicle's origin and intended destination
7) Type of cargo carried by vehicle
8) Last carrier/party reporting vehicle's most recent status
9) Identification of most recent vehicle change from first party to second party
10) Handling railroad
11) Car status at last location
12) Type of event
13) X/Y/Z axis acceleration values.

22. The method of claim 19, wherein the secondary data includes at least two of:

1) Vehicle ID
2) Current vehicle location
3) Date/Time of event
4) Geographic area/road vehicle reporting on
5) Vehicle's last reported location
6) Vehicle's origin and intended destination
7) Type of cargo carried by vehicle
8) Last carrier/party reporting vehicle's most recent status
9) Identification of most recent vehicle change from first party to second party
10) Handling railroad
11) Car status at last location
12) Type of event
13) X/Y/Z axis acceleration values.

23. A system for mapping occurrences of conditions along a transport route travelled by a vehicle storing cargo, comprising:

at least one mobile sensing station mounted on the vehicle traversing said transport route, said mobile sensing station detecting occurrences of the conditions along the transport route to the vehicle, at least one of the conditions indicating that the vehicle is influenced by said at least one of the conditions, receiving positional data, correlating the positional data with corresponding occurrences of the conditions, and transmitting the correlated data; and a central controller receiving the correlated data from said mobile sensing station, determining responsive to the correlated data a position on the transport route at which the occurrences of the conditions are detected, determining responsive to at least one of the position and the transport route a relevant party to be notified of the occurrence of the condition, and transmitting to the relevant party a message indicating the occurrence of the condition.

24. The system of claim 23, wherein said mobile sensing station determines acceleration of the vehicle along at least one axis.

25. The system of claim 23, further comprising another communications system linking said central controller and at least one user terminal, said central controller transmitting the correlated data to the user terminal.

26. The system of claim 25, wherein said central controller further receives requests to access the correlated data from the user terminal.

27. The system of claim 26, wherein said central controller further transmits a trigger signal to said mobile sensing station to initiate transmission of the correlated data from the mobile sensing station.

28. The system of claim 23, wherein the positional data is derived by said mobile sensing station from data transmitted from an orbiting satellite location system.

29. The system of claim 23, wherein at least one of said mobile sensing station and said central controller operates responsive to a detection of one of the occurrences of the conditions in the transport route.

30. The system of claim 23, wherein at least one of said mobile sensing station and said central controller operates in response to detection of a plurality of said occurrences of said predetermined conditions in said transport route.

31. The system of claim 23, wherein said mobile sensing station transmits in response to a trigger signal sent by said central controller.

32. The system of claim 25, further comprising a display located at said user terminal, and said user terminal requests access to the correlated data at the central controller.

33. The system of claim 32, wherein said user terminal comprises a modem and a personal computer to request access to the correlated data.

34. The system of claim 25, wherein said another communications system comprises a switched telephone network.

35. The system of claim 25, wherein said another communications system comprises a data link.

36. The system of claim 23, wherein said communications system comprises a cellular telephone network.

37. The system of claim 23, wherein said mobile sensing station includes an accelerometer arranged to detect acceleration with respect to time along three orthogonal axes.

38. The system of claim 23, wherein said central controller is unaffiliated with the party.

39. The system of claim 23, wherein said central controller determines the relevant party responsive to a combination of the multiple occurrences of the conditions.

40. The system of claim 39, wherein said central controller determines the relevant party in accordance with the occurrence of the condition that is first detected when the multiple occurrences of the conditions is present.

41. The system of claim 23, further comprising at least one user terminal having a display, said central controller transmitting the correlated data to the user terminal wherein said display displays the correlated data so as to identify positions on the transport route at which the occurrences of the conditions are detected to the vehicles travelling along the transport route, enabling the vehicles that travel along the transport route to be advised of the conditions.

42. The system of claim 41, wherein the vehicles perform corrective measures to minimize the impact of the conditions and to minimize the adverse impact to the vehicle responsive to the correlated data identifying positions on the transport route at which the occurrences of the conditions are detected.

43. The system of claim 23, wherein said central controller transmits to the relevant party an accountability report in the message requiring resolution.

44. The system of claim 23, wherein said central controller retrieves secondary data from secondary data sources to assist in the identification of the relevant party to be notified.

45. The system of claim 44, wherein when said central controller determines the relevant party that is inconsistent with the secondary data, said central controller determines the relevant party in accordance with predetermined rules used to resolve the inconsistency.

46. The system of claim 44, wherein the secondary data includes at least one of:

1) Vehicle ID
2) Current vehicle location
3) Date/Time of event
4) Geographic area/road vehicle reporting on
5) Vehicle's last reported location
6) Vehicle's origin and intended destination
7) Type of cargo carried by vehicle
8) Last carrier/party reporting vehicle's most recent status
9) Identification of most recent vehicle change from first party to second party
10) Handling railroad
11) Car status at last location
12) Type of event
13) X/Y/Z axis acceleration values.

* * * * *